(12) United States Patent
Chou et al.

(10) Patent No.: US 12,248,532 B2
(45) Date of Patent: Mar. 11, 2025

(54) OPTIMIZATION PROCESSING UNIT UTILIZING DIGITAL OSCILLATORS

(71) Applicant: Sync Computing Corp., Cambridge, MA (US)

(72) Inventors: Jeffrey Chou, Boston, MA (US); Suraj Bramhavar, Arlington, MA (US); Jeffrey G. Bernstein, Middleton, MA (US)

(73) Assignee: Sync Computing Corp., Cambridge, MA (US)

( * ) Notice: Subject to any disclaimer, the term of this patent is extended or adjusted under 35 U.S.C. 154(b) by 896 days.

(21) Appl. No.: 17/387,294

(22) Filed: Jul. 28, 2021

(65) Prior Publication Data

US 2022/0035889 A1 Feb. 3, 2022

Related U.S. Application Data

(60) Provisional application No. 63/058,418, filed on Jul. 29, 2020, provisional application No. 63/058,420, filed on Jul. 29, 2020.

(51) Int. Cl.
*G06F 17/13* (2006.01)
*G06F 13/36* (2006.01)

(52) U.S. Cl.
CPC .............. *G06F 17/13* (2013.01); *G06F 13/36* (2013.01)

(58) Field of Classification Search
CPC ................................ G06F 17/13; G06F 13/36
See application file for complete search history.

(56) References Cited

U.S. PATENT DOCUMENTS

| | | |
|---|---|---|
| 2008/0164916 A1 | 7/2008 | Petrovic |
| 2014/0176203 A1 | 6/2014 | Matheny |
| 2016/0099720 A1 | 4/2016 | Bashir |
| 2016/0162798 A1 | 6/2016 | Marandi |
| 2017/0104493 A1 | 4/2017 | Goto |
| 2018/0351563 A1 | 12/2018 | Allott |

*Primary Examiner* — Michael D. Yaary
(74) *Attorney, Agent, or Firm* — Van Pelt, Yi & James LLP

(57) ABSTRACT

A system including digital oscillators and at least one programmable interconnect is described. The programmable interconnect(s) provide weights for and selectably couples at least a portion of the digital oscillators. The digital oscillators and the programmable interconnect(s) form an optimization processing unit (OPU). A system for performing reversible logic is also described. The system includes digital oscillators coupled to perform a logic operation and an error correction unit coupled to the digital oscillators. The error correction unit is configured to sample states of the digital oscillators, detect error(s) in the states, and tune connection coefficient(s) between the oscillators in response to detecting the error(s).

12 Claims, 12 Drawing Sheets

OPTIMIZATION PROCESSING UNIT UTILIZING DIGITAL OSCILLATORS

CROSS REFERENCE TO OTHER APPLICATIONS

This application claims priority to U.S. Provisional Patent Application No. 63/058,418 entitled OPTIMIZATION PROCESSING UNIT UTILIZING DIGITAL OSCILLATORS filed Jul. 29, 2020 and U.S. Provisional Patent Application No. 63/058,420 entitled OSCILLATOR-BASED REVERSIBLE LOGIC HAVING ERROR CORRECTION filed Jul. 29, 2020, both of which are incorporated herein by reference for all purposes.

BACKGROUND OF THE INVENTION

Certain problems, such as combinatorial optimization (CO) problems, are difficult to solve utilizing standard computing architectures. Such CO problems have a wide range of applications, from resource allocation and traffic routing to DNA sequencing and drug discovery. CO problems, such as the traveling salesman problem, may be more effectively solved using other means. Various technologies, including quantum computers, may be used in solving such problems. However, there are drawbacks to techniques such as quantum computing. For example, quantum computers are difficult to manufacture and expensive to maintain. Standard computing methods may also be utilized. However such standard methods are fundamentally limited.

For example, scheduling of compute tasks is a large, complex problem that can rapidly increase in complexity. Scheduling of compute tasks may be used in a variety of computing workloads such as scientific simulations, machine learning, and/or data analytics. Scheduling includes mapping compute jobs to available compute, network, memory and disk resources in the cloud or on on-premises (e.g. in datacenters). The problem of optimally assigning tasks to processors becomes significantly more difficult with increases in number of tasks and/or the number of processors. Solving for the scheduling that allocates resources in an optimal or close-to-optimal fashion using conventional techniques may take an extremely long time. Consequently, other mechanisms for scheduling are typically used. For example, tasks may simply be scheduled to available processors in the order the tasks are received. Such strategies may result in poor allocation of resources, may further degrade performance, and may increase the cost for the end user. Consequently, techniques for improving the allocation of resources in computer systems are desired. Increasingly, modern computing workloads are no longer isolated to a single computing element, but are distributed across many computers, making this need greater with time.

BRIEF DESCRIPTION OF THE DRAWINGS

Various embodiments of the invention are disclosed in the following detailed description and the accompanying drawings.

DETAILED DESCRIPTION

Figure 1A:
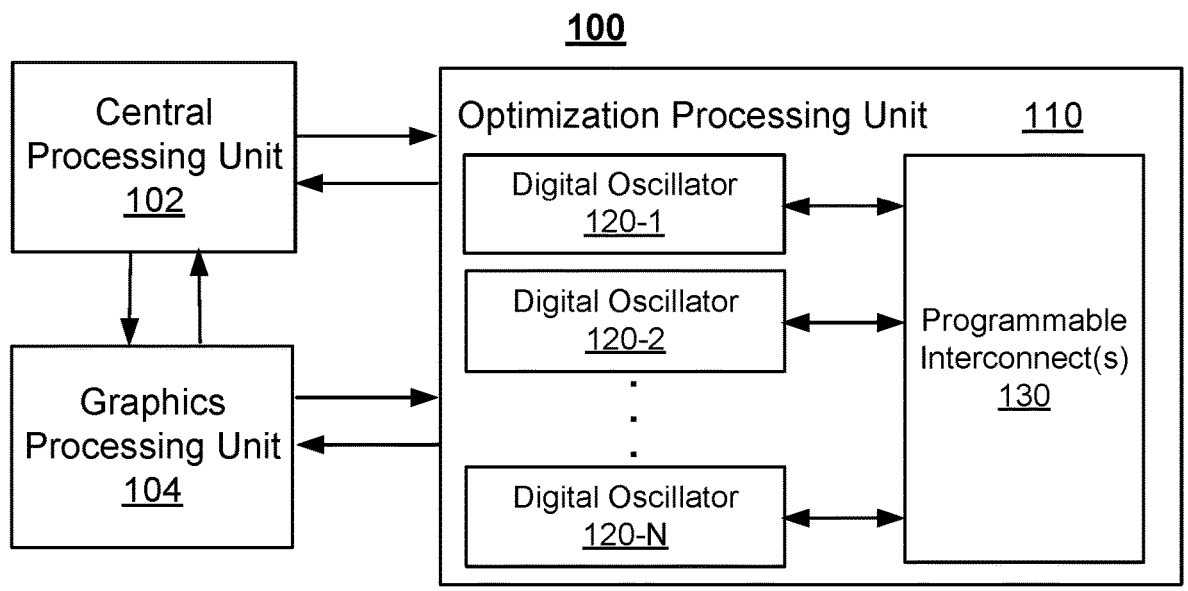
FIGS. 1A-1C depict an embodiment of a system utilizing an optimization processing unit including digital oscillators.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Certain fields present significant challenges to obtaining solutions using standard computing architectures. Although technologies such as quantum computing architectures may be used in solving such problems, there are significant drawbacks. Standard computing methods may be limited in speed. Solutions obtained using other more recently developed computing methods may not have the desired precision. Consequently, an improved mechanism that is usable in addressing complex and/or difficult to solve problems is desired.

Techniques usable in optimization processing and/or solving complex problems are described. A system including digital oscillators and at least one programmable interconnect is described. The programmable interconnect(s) provide weights for and selectably couples at least a portion of the digital oscillators. The digital oscillators and the programmable interconnect(s) form an optimization processing unit (OPU). In some embodiments, processor(s), such as a central processing unit (CPU) and/or a graphics processing unit (GPU), are coupled to the OPU.

In some embodiments, the digital oscillators include injection locked digital oscillators. In some embodiments, an injection locked digital oscillator is configured to have two stable states. In some embodiment, the differential equation solver is configured to model real and imaginary portions of a state. The state corresponds to a phase of the injection locked digital oscillator. The digital oscillator may be configured as a differential equation solver. In some embodiments, the differential equation solver solves at least one governing differential equation for a resistance-inductance-capacitance circuit. In some embodiments, the differential equation solver may be configured to solve coupled differential equations corresponding to a satisfiability problem. The differential equation solvers may be configured for Euler's method and/or to utilize the Kuramoto model. The programmable interconnect(s) may include digital matrix multiplier(s). In some embodiments, the digital matrix multiplier sparsely connects the plurality of digital oscillators. In some embodiments, the digital matrix multiplier fully connects the plurality of digital oscillators. The connections (e.g. sparse or fully connected) may vary throughout use of the system in some embodiments. The programmable interconnect(s) may also perform other functions.

In some embodiments, a method and/or a computer a computer program product embodied in a non-transitory computer readable storage medium are described. The method includes receiving, at an OPU, data for at least a portion of an optimization problem. In some embodiments, the data may be received at the OPU from a CPU and/or GPU. The OPU includes digital oscillators and programmable interconnect(s). Thus, the OPU may be analogous to that described herein. In some embodiments, the information provided by the user may be in the form of a quadratic unconstrained binary optimization (QUBO) problem. In some embodiments, the information provided by the user may be in the form of a quadratic programming form (QP) problem. In some embodiments, the information provided by the user may be in the form of an Ising Model. In some embodiments, the information provided by the user may be in the form of a linear program (LP) problem or a satisfiability (sat) problem. In some embodiments, the information provided may be in another form.

Responses for the optimization problem are calculated in the digital oscillators. For example, data may be input to and responses sampled from each digital oscillator. In some embodiments, the digital oscillators are injection locked digital oscillators. Thus, calculating the responses may include receiving the injection lock signal at the digital oscillators. Weights are applied to the responses from the digital oscillators to provide weighted responses. This may be accomplished via the programmable interconnect(s). The weighted responses are provided as input(s) some or all of the remaining digital oscillators. The digital oscillators receiving the weighted responses may be selected via the programmable interconnect(s). This process of receiving responses from digital oscillators, weighting the responses and providing the weighted responses as input(s) to some or all of the digital oscillators may be repeated one or more times. The OPU may then provide optimized responses to the portion of the problem received.

Boolean logic ("logic") gates, such as OR, NOR, AND and XOR gates, are usable for a variety of computations. For such gates, the output of the gate given a set of inputs to the gate is well known. For example, for an OR gate, the output of the gate is a logical "1" if at least one of the inputs to the gate is also a logical "1". Reversible logic gates are those from which the inputs can be determined for a particular output. For example, if the output of the particular oscillator(s) are forced to specific value(s) (e.g. a logical "1" or a logical "0"), the inputs to the logic gate are forced to take on valid values for the specific value(s). In principle, reversible logic may be used in applications such as factoring in computer security applications and/or other fields.

A system for performing reversible logic is also described. The system includes digital oscillators coupled to perform a logic operation and an error correction unit coupled to the digital oscillators. Thus, the digital oscillators may be considered to form a logic gate corresponding to the logic operation. Such a system of coupled oscillators may be described by the Ising (or another) model. Solving the Ising (or the other) model for the system results in the output of particular oscillator(s) in the system mimicking the behavior of a logic gate for inputs to oscillator(s) in the system. Logic gates constructed using oscillators may be useful because such logic gates are reversible, but are also subject to errors.

Thus, the system includes the error correction unit. The error correction unit is configured to sample states of the digital oscillators, detect error(s) in the states, and tune connection coefficient(s) between the oscillators in response to detecting the error(s). In some embodiments, the error correction unit tuning the connection coefficient(s) includes the error correction unit pinning the connection coefficient(s) at a first value corresponding to a logical "1" or a second value corresponding to a logical "0". In some embodiments, the digital oscillators are injection locked digital oscillators. Thus, in such embodiments, the digital oscillators receive injection lock signals. The injection locked digital oscillator may be configured to model a real portion of a state and an imaginary portion of the state, the state corresponding to a phase of the injection locked digital oscillator. In some embodiments, each digital oscillator is a differential equation solver selected from a Kuramoto model differential equation solver and an Euler's method differential equation solver.

Figure 1B:
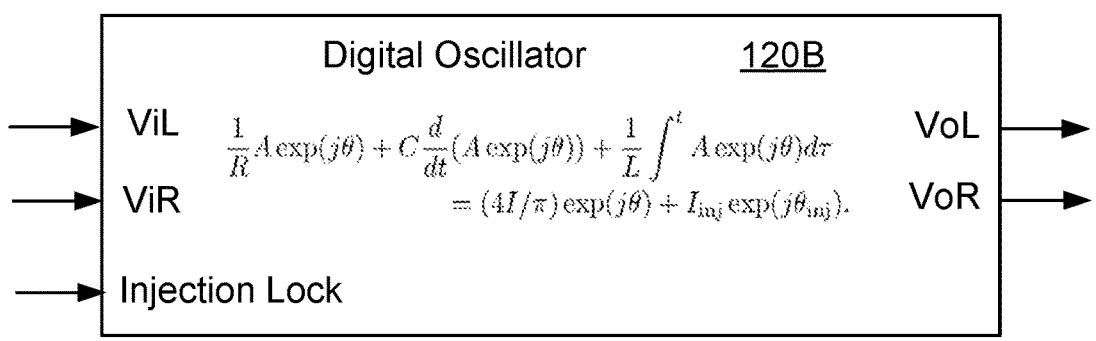
Figure 1C:
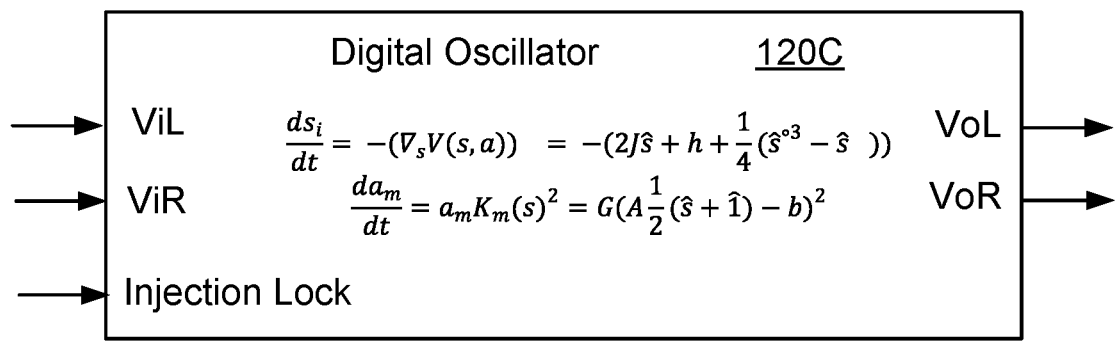

FIGS. 1A and 1C are block diagrams depicting an embodiment of system 100. FIG. 1A depicts system 100 including OPU 110. FIG. 1B depicts an embodiment of digital oscillator 120B usable in OPU 110. FIG. 1C depicts an embodiment of digital oscillator 120C usable in OPU 110. System 100 is usable in combinatorial optimization (CO) and/or in other fields. For example, system 100 may be used in fields in having complex problems and/or problems which are challenging to solve using conventional architectures. For example, system 100 may be used in scheduling compute tasks and/or other allocation of resources. For clarity, only certain components of system 100 are depicted. System 100 includes CPU 102 and GPU 104 in addition to OPU 110. Although system 100 is described in the context of a single OPU 110, a single CPU 102 and a single GPU 104, system 100 may include multiple OPUs, multiple CPUs and/or multiple GPUs. In some embodiments, CPU 102 and/or GPU 104 may be omitted. Further, in the case of multiple OPUs, all OPUs can, but need not, be configured in a manner analogous to OPU 110.

CPU 102 may be used to carry out various functions associated with optimization processing. CPU 102 may read and decode instructions and offload at least some of its work to OPU 110, GPU 104 and/or FPGAs (not shown), depending on the instructions. In some embodiments, CPU 102 can itself perform some of the optimization. More specifically, CPU 102 can be used for solving CO problems defined in a classical manner e.g. as a linear programming solution. The CO problem itself can be partitioned into a classical part and an OPU part. In one embodiment, the classical part can be solved using CPU 102 and the OPU part can be solved using an OPU 110, GPU 104 and/or FPGA(s) (not shown in FIGS. 1A-1C). The part of the problem that is to be partitioned between various units (e.g. CPU 102, GPU 104 and/or OPU 110) can be defined by a user through a programmable interface (not shown in FIG. 1A). The user can choose to partition the workload related to solving the CO problem between CPU 102, GPU 104, FPGA(s), and/or OPU 110. Partitioning the problem into classical versus stochastic computing parts is also programmable. Thus, the systems and techniques described herein are programmable, e.g. by the user.

OPU 110 includes programmable interconnect 130 and digital oscillators 120-1, 120-2 through 120-N (collectively digital oscillators 120/generically digital oscillator 120). For simplicity, OPU 110 is described in the context of a single programmable interconnect 130. However, in some embodiments, multiple programmable interconnects are present. N digital oscillators 120 capable of functioning in parallel are shown. In FIG. 1A, digital oscillators 120 are shown as the same. However, in other embodiments, digital oscillators 120 may differ.

Programmable interconnect 130 is configured to provide weights for and to selectably couple some or all of digital oscillators 120. For example, results sampled from a particular digital oscillator 120 are weighted and provided to some or all of the remaining digital oscillators 120 via programmable interconnect 130. In some embodiments, programmable interconnect 130 fully connects digital oscillators 120. In such a case, each digital oscillator 120 is coupled with all other digital oscillators 120 in OPU 110. In some embodiments, programmable interconnect 130 sparsely connects digital oscillators 120. In this case, each digital oscillator 120 is connected with a subset of the remaining digital oscillators 120. In some embodiments, the connections between digital oscillator(s) 120 are reconfigurable and, therefore, not fixed in hardware. In other embodiments, the digital oscillator(s) 120 that are coupled via programmable interconnect 130 are fixed. Programmable interconnect 130 may be or include a digital matrix multiplier. Such a digital matrix multiplier may be implemented via an FPGA, GPU, and/or an application specific integrated circuit (ASIC). Thus, programmable interconnect 130 may be viewed as weighting and mixing signals from digital oscillators 120 and providing weighted, mixed signals as inputs to one or more other digital oscillators 120. In some embodiments, programmable interconnect 130 may perform additional functions. For example, some calculations for digital oscillators 120 may be offloaded to programmable interconnect 130.

In some embodiments, digital oscillators 120 digitally model periodic (or wave) functions and/or the corresponding systems. More generally, digital oscillators 120 model a system governed by one or more differential equations. Stated differently, a digital oscillator 120 may be a differential equation solver for a periodic differential equation and/or a differential equation solver for the differential equation(s) governing particular systems. For example, a digital oscillator 120 may model an analog oscillator, such as an inductive-capacitive (LC) or resistive-inductive-capacitive (RLC) circuit. Such a digital oscillator 120 may be viewed as solving the differential equation for an LC or RLC circuit. A digital oscillator 120 may model Schrodinger's equation (i.e. the differential equation related to the Hamiltonian) of an electron. Thus, digital oscillator 120 may solve Schrodinger's (differential) equation to find the ground states of the electron. Digital oscillator 120 may model the portion of the Ising Hamiltonian for a spin in a system of coupled spins. Stated differently, digital oscillator 120 may be used to model the differential equation (i.e. the Ising Hamiltonian) for a system of coupled spins in which each spin may have a +1 state or −1 state. Thus, digital oscillator 120 may be used to model a particular system governed by differential equations.

Similarly, digital oscillator 120 may be viewed as solving differential equations that can be used to solve particular problems. As discussed above, some CO problems may be solved via digital oscillators configured to solve differential equations. Similarly, satisfiability problems, such as Boolean satisfiability problems (k-SAT problems), may be described by differential equations. A k-SAT problem has a set of Boolean variables and conditions related to the variables. The conditions relate to the values taken by subsets of the Boolean variables. Using the method proposed by Maria Ercsey-Ravasz, et al., the k-SAT problem can be described by an energy function. It has been determined that the energy function can be generalized and mapped to an Ising model. It has also been determined that this model is governed by a particular set of differential equations. Moreover, such a k-SAT problem, and the differential equations governing the problem, correspond to an optimized solution to a scheduling problem. Thus, digital oscillators 120 may also be used in solving differential equations to which scheduling problems have been mapped.

Digital oscillator 120 may employ various mechanisms including but not limited to Euler's method and the Kuramoto model to solve such differential equations. In some embodiments, digital oscillator 120 includes or consists of digital circuit components that are utilized at temperatures at or above zero degrees Celsius (e.g. room temperature or above). In some embodiments, digital oscillators 120 may include or consist of circuit components formed on silicon wafers as part of an integrated circuit. Thus, digital oscillators 120 include digital circuit components which are connected and configured to solve the corresponding differential equations using a mechanism such as Euler's method and/or the Kuramoto model.

The combination of digital oscillators 120 coupled via programmable interconnect 130 digitally models coupled differential equations, coupled periodic functions and/or the corresponding coupled systems. Coupled together via programmable interconnect 130, digital oscillators 120 may be viewed as functioning substantially in parallel to digitally solve a set of coupled differential equations. For example, coupled digital oscillators 120 may be used to model the Ising Hamiltonian used to solve CO problems. Thus, digital oscillators 120 coupled via programmable interconnect 130 may model systems having nodes coupled in accordance with the Ising model. In some embodiments, OPU 110 (i.e. digital oscillators 120 in combination with programmable interconnect 130) models a system of coupled analog oscillators, such as coupled LC circuits and/or coupled RLC circuits. Thus, OPU 110 may solve the differential equations governing a set of coupled LC and/or RLC circuits. In some embodiments, OPU 110 may solve the differential equations governing the phases of a set of coupled LC and/or RLC circuits. OPU 110 may be used to model Schrodinger's equations for electrons in a molecule. Electrons in such a molecule interact. Thus, digital oscillators 120 coupled via programmable interconnect 130 solve the differential equations governing the wave functions for interacting (i.e. coupled) electrons in the molecule. OPU 110 may, therefore, determine the ground states of the electrons in the molecule. In some embodiments, OPU 110 may solve the differential equations governing a k-SAT problem, or the Ising Hamiltonian to which a k-SAT problem has been mapped. Thus, digital oscillators 120 in conjunction with programmable interconnect 130 may be used to model a particular system governed by coupled differential equations. Such digital oscillators 120 may employ various mechanisms including but not limited to Euler's method and the Kuramoto model. Digital oscillators 120 are thus configured to provide, based on data input to digital oscillators 120 and weights provided via programmable interconnect 130, responses that are probabilistic and periodic in nature. For example, the responses may be based upon the phases corresponding to digital oscillator 120 at the particular time the oscillator(s) are sampled.

In some embodiments, digital oscillators 120 are injection locked digital oscillators. Injection locked digital oscillators 120 may be more likely to synchronize to reach a stable state for the combination of digital oscillators 120. In some embodiments, each injection locked digital oscillator 120 may settle in one of two states. For example, the phases of the oscillators may be considered to be 0° or 180° and may differ based upon initial conditions for the oscillator and/or the time at which the oscillator is sampled. The phases of these oscillators may be used to model equations, such as the Hamiltonian (e.g. the Ising Hamiltonian) used for some CO problems. The phases of these oscillators 120 may also be used to model the corresponding differential equations for the phases of oscillators used in providing a solution to the Ising Hamiltonian. In some embodiments, injection locked digital oscillators are configured by providing injection lock signals to digital oscillators 120. The frequency of such injection lock signals is greater than the frequency of the corresponding digital oscillator 120. In some embodiments, the injection lock signal is at 1.5 multiplied by the frequency and not more than 2.5 multiplied by the frequency of the corresponding digital oscillator 120. For example, in some embodiments, the injection lock signal is at nominally twice the frequency of the corresponding digital oscillator 120. Thus, injection locked digital oscillators 120 may synchronize to provide a stable set of states for digital oscillators 120 coupled via programmable interconnect 130.

FIG. 1B depicts a particular digital oscillator 120B that can be utilized as one or more of digital oscillators 120. In the embodiment shown, digital oscillator 120B is an injection locked digital oscillator. Thus, digital oscillator 120B receives an injection lock signal. In some embodiments, the injection lock signal has a frequency that is nominally twice the modeled oscillator frequency. The injection lock signal assists in syncing digital oscillators 120 to provide the solution to the coupled differential equations (or coupled system) being modeled. Digital oscillator 120B also receives inputs ViL and ViR and provides outputs VoL and VoR. Inputs ViL and ViR correspond to weighted inputs provided by programmable interconnect 130 using outputs of other digital oscillators 120. Outputs VoL and VoR are outputs provided by digital oscillator 120B. In some embodiments, digital oscillator 120B is configured to solve a differential equation governing a corresponding analog LC oscillator.

Thus, in some embodiments digital oscillator 120B is configured to solve the following equation or its analog:

$$\frac{1}{R} A\exp(j\theta) + C\frac{d}{dt}(A\exp(j\theta)) + \frac{1}{L}\int^t A\exp(j\theta)d\tau =$$

$$(4I/\pi)\exp(j\theta) + I_{inj}\exp(j\theta_{inj}).$$

In the above equation, A is a scale factor, C is the capacitance, R is the resistance, L is the inductance, $I_{inj}$ is the amplitude of the injection locking signal, I is the current. Digital oscillator 120B may thus be viewed as modeling a particular oscillating LC circuit that is coupled with other oscillators. In some embodiments, for example, digital oscillator 120B may utilize Euler's method (described herein), the Kuramoto model (described herein) to solve the above differential equation and model the oscillators. In some embodiments, other differential equations may be modeled.

FIG. 1C depicts a particular digital oscillator 120C that can be used as one or more of digital oscillators 120. In the embodiment shown, digital oscillator 120C is an injection locked digital oscillator. Thus, digital oscillator 120C receives an injection lock signal that is analogous to the injection lock signal provided for digital oscillator 120B. The injection lock signal assists in syncing digital oscillators 120 to provide the solution to the coupled differential equations (or coupled system) being modeled. Digital oscillator 120C also receives inputs ViL and ViR and provides outputs VoL and VoR. Inputs ViL and ViR correspond to weighted inputs provided by programmable interconnect 130 using outputs of other digital oscillators 120. Outputs VoL and VoR are outputs provided by digital oscillator 120C. In some embodiments, digital oscillator 120C is configured to solve a differential equation governing a corresponding Ising model to which a k-SAT problem has been mapped. Thus, in some embodiments digital oscillator 120C is configured to solve the following coupled differential equations or their analogs:

$$\frac{ds_i}{dt} = -(\nabla_s V(s, a)) = -\left(2J\hat{s} + h + \frac{1}{4}(\hat{s}^{\circ 3} - \hat{s})\right)$$

$$\frac{da_m}{dt} = a_m K_m(s)^2 = G\left(A\frac{1}{2}(\hat{s} + \hat{1}) - b\right)^2$$

In the above equations, the right side is in matrix/vector form, $s_i$ is the $i^{th}$ Ising spin, $a_m$ is a term multiplied by the $m^{th}$ constraint, $K_m$ is the $m^{th}$ constraint, V is the energy matrix that depends upon the spins (s) and the constraint terms (a), G is a diagonal matrix including $a_m$ on its diagonal (where m is the row and column of the matrix) and 0 elsewhere, Ax−b (in matrix form) corresponds to the problem matrix, $s_i=2x_i-1$, $\hat{s}^{\circ 3}$ is the s matrix with each element cubed, J and h weights that may be changed. In some embodiments, for example, digital oscillator 120C may utilize Euler's method (described herein), the Kuramoto model (described herein) to solve the above differential equations and, therefore, provide an optimized solution to the k-SAT problem. In some embodiments, other differential equations may be modeled.

System 100 including OPU 110 may be utilized in solving complex problems, such as CO problems and k-SAT problems including but not limited to scheduling problems. Digital oscillators 120 operate in parallel. Thus, OPU 110 may more rapidly and efficiently provide responses to input data. Digital oscillators 120 may be built on silicon and/or run at temperatures well above liquid helium (e.g. above four Kelvin). In some embodiments, digital oscillators 120 are used at temperatures of at least zero degrees Celsius. For example, digital oscillators 120 may operate at or above room temperature (approximately twenty-three degrees Celsius). Consequently, OPU 110 may be more readily fabricated and utilized than, for example, quantum processors. Because programmable interconnect 130 is reconfigurable, not only can the weight(s) applied be changed, but the digital oscillators 120 to which the weighted responses are applied can be altered. Programmable interconnect 130 creates a much more versatile platform and help address a wider array of problems, as different applications tend to have different connectivity requirements. This is in stark contrast to both quantum systems which have limited connectivity and alternative digital annealers which aim for full all-all connectivity and as a result have limited size. In addition, the communication between OPU 110 and remaining components of system 100, such as CPU 102 and/or GPU 104 may be facilitated and subject to reduced latency than other mechanisms such as quantum computing. Further, use of digital oscillators 120 allows for increased precision in the responses provided by OPU 110 over analog systems. Moreover, system 100 and OPU 110 may provide improved solutions to problems, such as the k-SAT problem in a shorter amount of time. Thus, jobs such as scheduling of compute tasks may be performed rapidly (e.g. in real-time or close to real-time) while providing an improved allocation of resources. Thus performance of system 100 may be improved and solutions to complex problems facilitated.

Figure 2A:
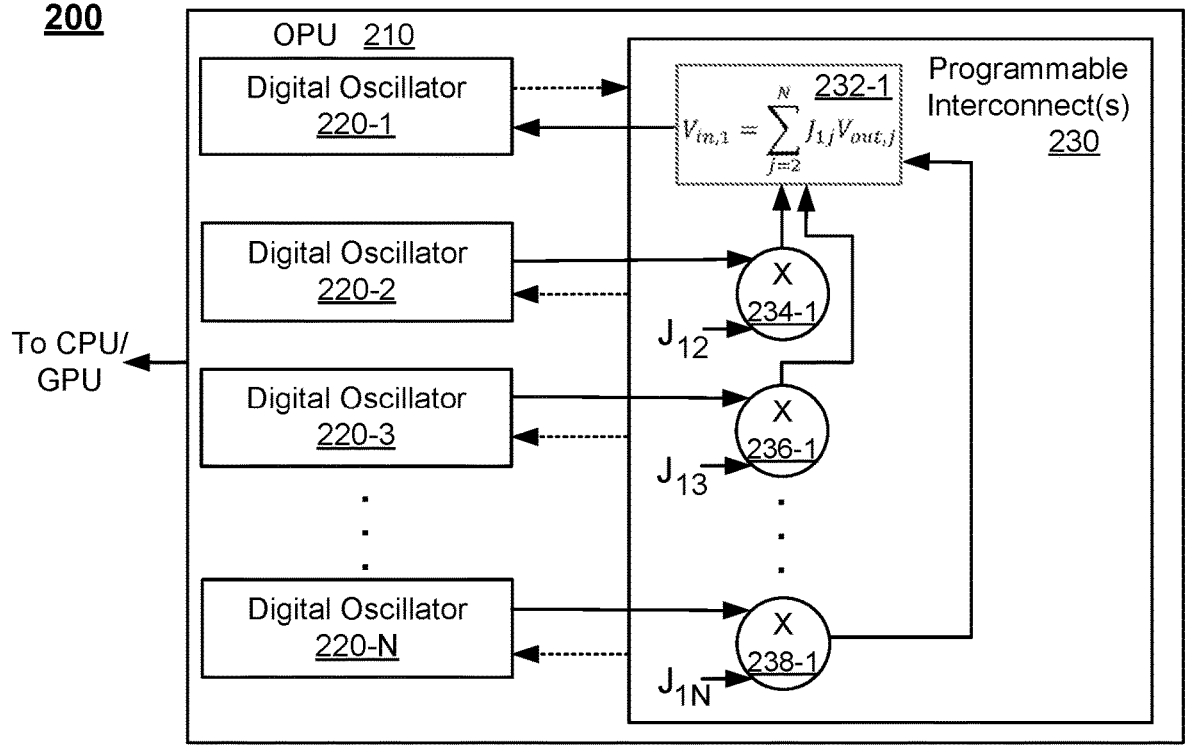
FIGS. 2A-2B depict an embodiment of a programmable interconnect usable in conjunction with digital oscillators.
Figure 2B:
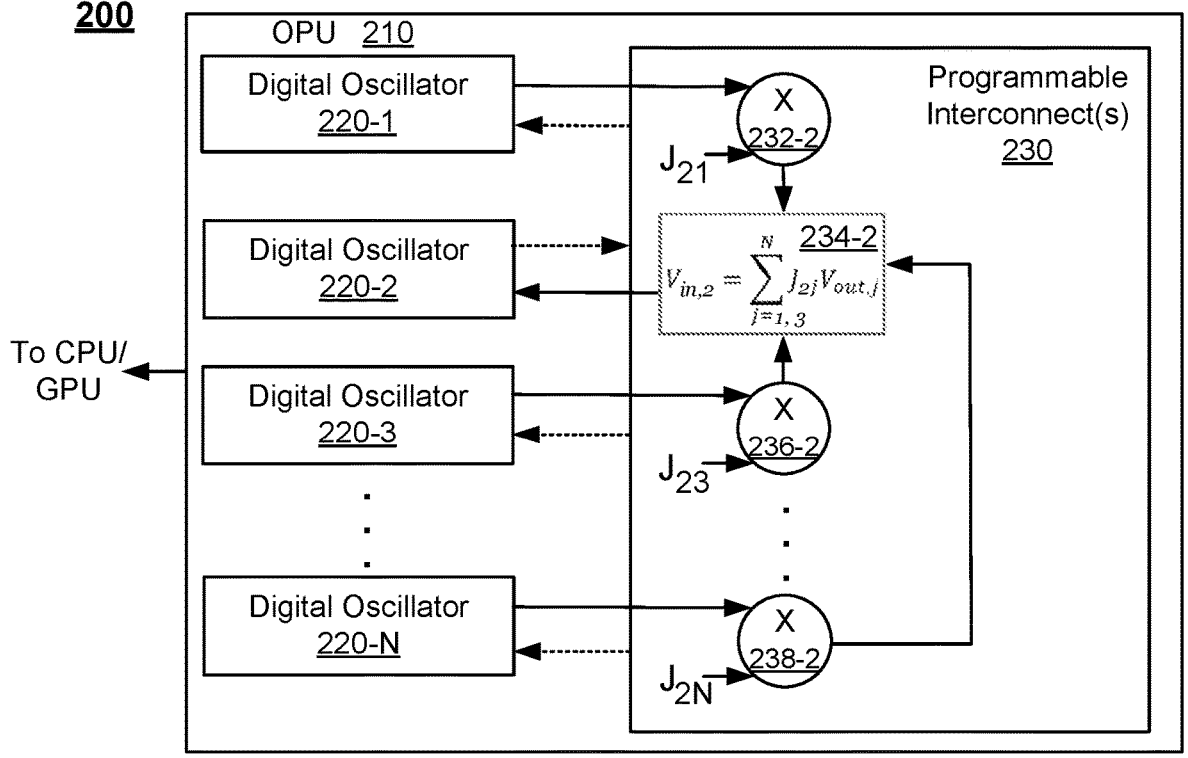

FIGS. 2A-2B depict an embodiment of a portion of system 200 usable in solving problems such as those in CO and/or other fields. System 200 is analogous to system 100 and includes OPU 210. OPU 210 is analogous to OPU 110 and includes programmable interconnect 230 and digital oscillators 220-1 through 220-N (collectively digital oscillators 220/generically digital oscillator 220). Programmable interconnect 230 is analogous to programmable interconnect 130. Digital oscillators 220 are analogous to digital oscillators 120, 120B and/or 120C. Digital oscillators 220 thus model a set of coupled differential equations.

FIG. 2A depicts the coupling between digital oscillator 220-1 and remaining digital oscillators 220 provided via programmable interconnect 230. Thus, FIG. 2A illustrates a portion of programmable interconnect 230. Each digital oscillator 220-2, 220-3 through 220-N has a corresponding multiplier 234-1, 236-1 through 238-1. The multipliers 234-1, 236-1 through 238-1 multiply the response of the corresponding digital oscillator 220-2, 220-3 through 220-N by the corresponding weight $J_{12}$, $J_{13}$ through $J_{1N}$. Multipliers 234-1, 236-1 through 238-1 output the weighted responses from digital oscillators 220-2, 220-3 through 220-N. In some embodiments, one or more of the weights $J_{1j}$ may be zero if digital oscillator 220-1 is desired to be decoupled from the $j^{th}$ digital oscillator. Adder 232-1 sums the weighted responses and provides the weighted responses to digital oscillator 220-1.

Similarly, FIG. 2B depicts the coupling between digital oscillator 220-2 and remaining digital oscillators 220 provided via programmable interconnect 230. Thus, FIG. 2B illustrates another portion of programmable interconnect 230. Each digital oscillator 220-1, 220-3 through 220-N has a corresponding multiplier 232-2, 236-2 through 238-2. The multipliers 232-2 and 236-2 through 238-2 multiply the response of the corresponding digital oscillator 220-1 and 220-3 through 220-N by the corresponding weight $J_{21}$ and $J_{23}$ through $J_{2N}$. Multipliers 232-2 and 236-2 through 238-2 output the weighted responses from digital oscillators 220-1 and 220-3 through 220-N. In some embodiments, one or more of the weights $J_{2j}$ may be zero if digital oscillator 220-2 is desired to be decoupled from the $j^{th}$ digital oscillator. Adder 234-2 sums the weighted responses and provides the weighted responses to digital oscillator 220-2.

The remaining portion of programmable interconnect 230 may be configured in an analogous manner. Thus, programmable interconnect 230 provides weights for and selectably couples digital oscillators 220. The combination of digital oscillators 120 coupled via programmable interconnect 230 digitally models coupled differential equations, coupled periodic functions and/or the corresponding coupled systems. Digital oscillators 120 may function substantially in parallel to digitally solve a set of coupled differential equations. System 200 may provide benefits analogous to those of system 100 including but not limited to more rapidly providing improved precision solutions to complex problems. Thus performance of system 200 may be improved.

Figure 3:
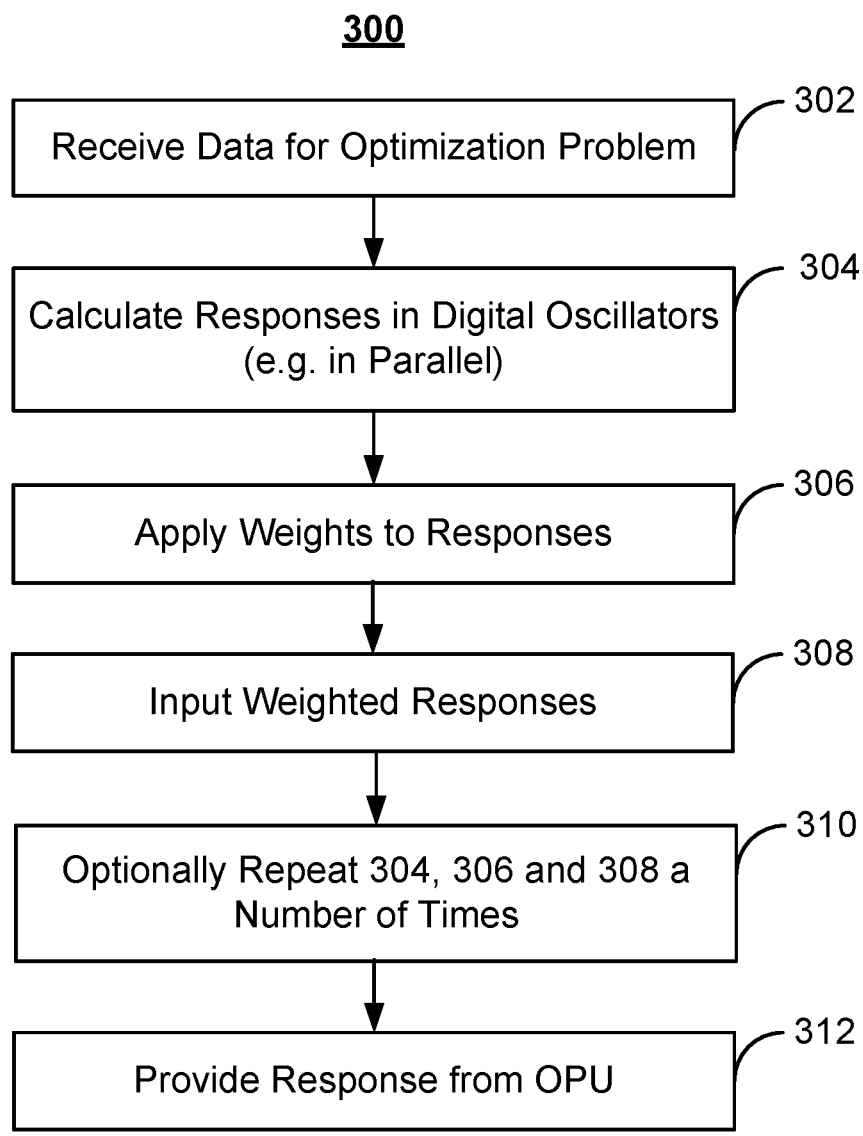
FIG. 3 depicts an embodiment of a method for utilizing digital oscillators in solving complex problems.

FIG. 3 is a flow chart depicting an embodiment of method 300 for performing optimization processing utilizing an OPU such as OPU 310. For example, method 300 may be used in CO and/or other disciplines. Method 300 commences after the user has defined the problem for which the OPU is utilized. For example, if a traveling salesman problem is desired to be solved, the cities visited, the distance between cities, cost of case, miles per gallon, cost of hotels, problem constraints, and other information is provided by the user. In some embodiments, the information provided by the user may be in the form of a quadratic unconstrained binary optimization (QUBO) problem: $x^T Q x + c^T x$, where x is a binary vector such that $x_i \in \{0,1\}$, Q is a 2D matrix of real numbers, and c is a vector of real numbers. The problem is encoded in the elements of Q and c. In some embodiments, the information provided by the user may be in the form of a quadratic programing form (QP) problem: $x^T Q x + c^T x$, where x is a continuous vector such that $x_i \in R$, Q is a 2D matrix of real numbers, and c is a vector of real numbers. The problem is encoded in the elements of Q and c. In some embodiments, the information provided by the user may be in the form of an Ising Model: $s^T J s + h^T s$, where s is a vector such that the elements are either +1 or −1 $s_i \in \{-1, +1\}$, J is a 2D matrix of real numbers, h is a vector of real numbers. The problem is encoded in the elements of J and h. In some embodiments, the information provided by the user may be in the form of a linear program (LP) problem: Ax−b, where x is a vector of real numbers $x_i \in R$, A is a matrix of real numbers, and b is a vector of real numbers. The problem is encoded in the elements of A and b. In some embodiments, the information provided may be in another form. In some embodiments, the CPU or GPU may break the problem up into smaller chunks for presentation to the OPU. In some embodiments, the CPU or GPU may use the OPU to address the problem in its entirety. The CPU and/or GPU may also be used to map the problem to the behavior of a system of nodes used in the OPU.

The OPU receives data for at least a portion of the optimization problem, at 302. In some embodiments, the OPU receives the input from the CPU or GPU. In addition to the inputs for the digital oscillators, the OPU may also receive weights for the programmable interconnect(s), an indication of the number of iterations performed by the digital oscillators, timing of changes to weights and/or other information used to address the optimization problem. Thus, the processing by the OPU may be managed by the CPU.

Using the data, the OPU calculates responses in the digital oscillators, at 304. In some embodiments, the digital oscillators may operate in parallel to provide their responses at 304. Thus, the appropriate data is provided to the digital oscillators. In some embodiments, the same data is provided to each of the digital oscillators. For example, the initial conditions such as initial phase for each digital oscillator may be the same. In some embodiments, different data are provided to different digital oscillators. For example, initial conditions such as the initial phase for each digital oscillator may be different. Further, in some embodiments, an injection lock signal is provided to each of the digital oscillators as part of 304. As a result, the digital oscillators more readily synchronize to their final states.

Weights are applied to the responses from the digital oscillators to provide weighted responses, at 306. In some embodiments, 306 may precede 304. In such cases, weights are applied to initial inputs to the digital oscillators. In other embodiments, 304 precedes 306. In some embodiments, the weights are applied by the programmable interconnect(s) and may be controlled by the CPU and/or GPU. In some embodiments, the weights are applied by an FPGA or other digital matrix multiplier. In some embodiments, the weight(s) applied to responses from a particular digital oscillator do not depend upon the digital oscillator(s) which receive the weighted response. In other embodiments, the weight(s) applied to responses from a particular digital oscillator do depend upon the digital oscillator(s) which receive the weighted response. In some embodiments, the weights may only be applied to a portion of the digital oscillators. The portion of the digital oscillators may be selected programmably by the user, which serves as a reconfigurable interconnect system. In some embodiments, the weight applied may be zero if the digital oscillator providing the response is desired to be decoupled from the digital oscillator receiving the response. In some embodiments, the weights applied to the responses may be scaled by a time step. The time step may be programmed by a user.

The weighted response(s) for the digital oscillator(s) are provided as inputs to some or all of the other digital oscillators, at 308. In some embodiments, 308 is performed by the programmable interconnect(s). Further, the selection of the digital oscillators to which the weighted response for a given digital oscillator is applied may be controlled by the CPU and/or GPU. In some embodiments, 304, 306 and 308 may be repeated as desired to update the responses from the digital oscillators, at 310. One or more responses are selected to be provided from the OPU, at 312. These responses may be provided to the CPU and/or GPU for use in solving the desired problem. In some embodiments, method 300 may be iterated multiple times. For example, the response provided from OPU at 312 may be utilized by the CPU or GPU to adjust weights for the optimization problem and method 300 repeated for the same portion(s) of the optimization problem. In some embodiments, the response provided at 312 may simply be utilized to provide a solution to the optimization problem. Method 300 may also be performed for other portion(s) of the optimization problem.

For example, if system 100 utilizes method 300, OPU 110 receives data for at least a part of the problem being addressed, at 302. The data is received at OPU 110 from CPU 102 and/or GPU 104. OPU 110 utilizes the data to calculate responses in digital oscillators 120, at 304. Thus, responses are determined in parallel by digital oscillators 120, at 304. The outputs (i.e. responses) from digital oscillators 120 are provided to programmable interconnect 130 also at 304. Programmable interconnect 130 applies weights to the outputs, at 306. These weighted outputs are (re) input to some or all of digital oscillators 120, at 308. This process of sampling each digital oscillator 120, weighting the outputs, and providing the weighted outputs as inputs to other digital oscillator(s) 120 may be iteratively performed multiple times in OPU 110, at 310. A response is provided from OPU 110 to CPU 102 and/or GPU 104, at 312. System 100 may repeat some or all of method 300. In some embodiments, the response provided at 312 for the first iteration may simply be utilized to provide a solution to the optimization problem. Method 300 may also be performed for other portion(s) of the optimization problem.

In another example, scheduling of multiple tasks on a number or processors is desired to be optimized. Thus, the user-defined problem is a scheduling problem. The tasks are subject to a number of constraints that are to be fulfilled. An exemplary constraint is that if a particular task is running on a given processor, no other tasks may run simultaneously on that processor. Thus, tasks running on a single processor do not conflict. Another constraint may be that particular tasks may not be started/provided to a processor until specified other task(s) have been completed. A simple schedule that satisfies the constraints could be to assign the tasks in series to a single processor. However, such an allocation of resources could consume a large amount of time. Optimization includes ensuring that all constraints are satisfied and that the tasks are allocated to processors in a manner that is more efficient (e.g. the set of tasks are assigned to processors such that processing is completed in a shorter amount of time). The scheduling problem may be mapped to a Boolean satisfiability problem. As discussed above, such a problem may be mapped to an Ising problem and the corresponding coupled differential equations described herein. Some or all of such a problem may be desired to be solved using method 300 and an OPU such as OPU 110 and/or 210.

At 302, the OPU receives data, such as an initial set of weights, the iterations to be performed or other mechanism for determining when a solution has been found, and/or other data such as the conditions to be satisfied and the maximum number of processors that may be used in scheduling. Using the data, the OPU calculates responses in the digital oscillators, at 304. In some embodiments, digital oscillators 120C are used to calculate solutions to the corresponding differential equations. In some embodiments, the digital oscillators may operate in parallel to provide their responses at 304. Weights are applied to the responses from the digital oscillators to provide weighted responses, at 306. The weighted response(s) for the digital oscillator(s) are provided as inputs to some or all of the other digital oscillators, at 308. In some embodiments, 308 is performed by the programmable interconnect(s). At 310, 304, 306 and 308 may be repeated as desired to update the responses from the digital oscillators, at 310. One or more responses are selected to be provided from the OPU, at 312. These responses correspond to the solution to the differential equations for the Boolean satisfiability problem. Thus, an optimized schedule may be provided.

Thus, using method 300, system 100 and OPU 110 may be used in solving challenging problems, for example in CO, scheduling, fluid dynamics, data analytics, and other fields. Because digital oscillators 120 operate in parallel, OPU 110 may more rapidly and efficiently provide responses using method 300. In addition, the communication between OPU 110 and remaining components of system 100, such as CPU 102 and/or GPU 104 may be facilitated and subject to reduced latency in implementing method 300. Further, because digital oscillators 120 are used, the precision of method 300 has improved.

Figure 4:
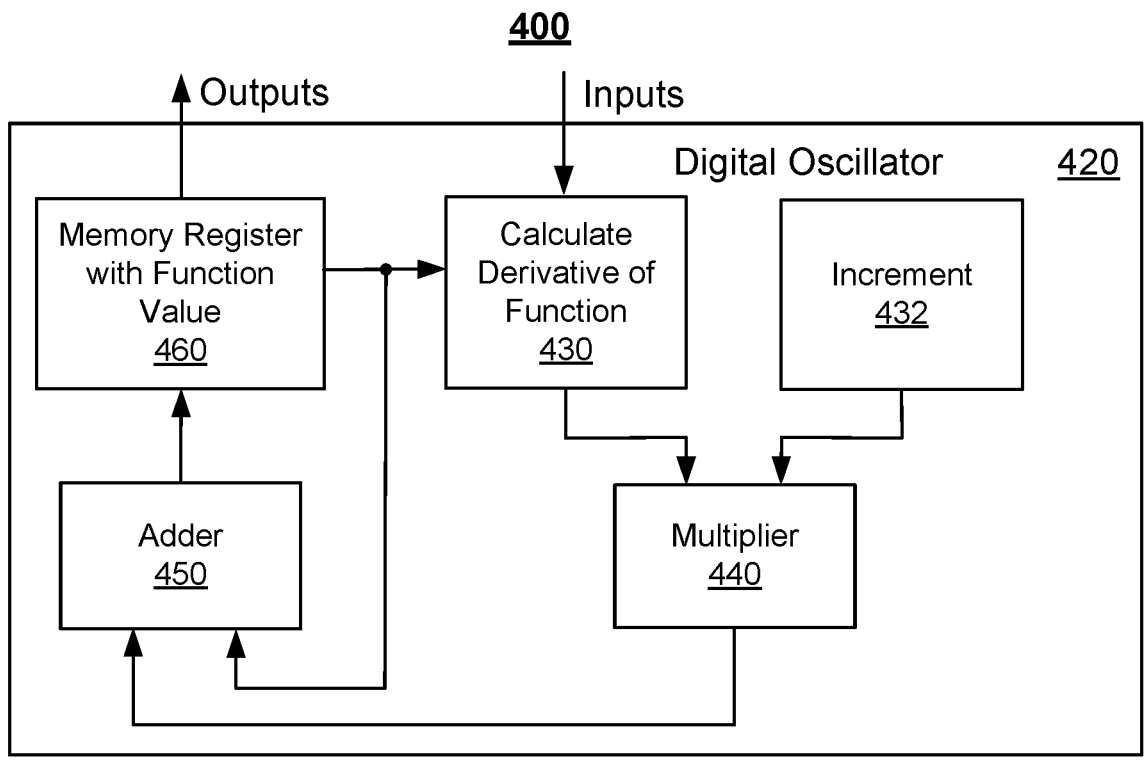
FIG. 4 depicts an embodiment of a digital oscillator.

FIGS. 4-8 depict various embodiments of systems 400, 500, 600, 700 and 800, respectively, including digital oscillators used in an OPU. FIG. 4 depicts a particular digital oscillator 420 that is analogous to digital oscillators 120, 120B, 120C, and/or 220 and can be used in systems 100 and/or 200. Digital oscillator 420 receives inputs including weighted response from other digital oscillators (not shown in FIG. 4) and outputs a response. In some embodiments, the inputs are provided by a programmable interconnect (not shown in FIG. 4). Digital oscillator 420 is configured to solve a differential equation. In some embodiments, digital oscillator 420 is configured to model a differential equation governing a corresponding LC oscillator. In some embodiments, other differential equations may be solved. Digital oscillator 420 utilizes Euler's method to model the differential equation. Thus, digital oscillator 420 includes derivative block 430 that calculates the derivative of the relevant function with respect to a particular variable. For example, derivative block 430 may calculate the derivative of a function for the phase of the corresponding LC oscillator with respect to time. Derivative block 430 may calculate other derivative(s) in other embodiments. Thus, derivative block 430 includes digital components that operate on an input signal to provide an output signal that corresponds to the derivative of the differential equation for that input signal. In either case, derivative block 430 includes digital components connected such that the derivative of the relevant differential equations for the inputs is provided as an output. Digital oscillator also includes increment block 432, which stores the amount by which the particular variable (e.g. time) is incremented. Digital oscillator 420 also includes multiplier 440, adder 450 and memory 450. Memory 450 stores the current value of the relevant function. For example, the current value of the phase may be stored in memory 460. In some embodiments, memory 460 is implemented as a register.

In operation, derivative block 430 utilizes inputs and the current value of the relevant function to calculate the derivative of the relevant function for the current iteration. Using increment 432, multiplier 440 multiplies the value of the derivative for the current iteration by the increment. This amount is added to the value of the relevant function for the previous iteration by adder 450. The result is stored by memory 460 as the current value of the relevant function. This current value of the relevant function is also output by memory 460. For example, if the relevant function is the phase of the oscillator over time, the derivative of the phase for the current iteration is calculated by derivative block 430. Multiplier 440 multiplies the value of the derivative of the phase with respect to time for the current iteration by a time increment received from increment block 432. The result is the amount the phase has changed in the time increment. This amount is added to the value of the phase from the previous iteration by added 450 to provide the current value of the phase. The current value of the phase is stored by memory 460 and output by digital oscillator 420. Although digital oscillator 420 is described in the context of phase being the value output, other functions may be used. For example, a function of the oscillator phase, such as the sine and/or cosine of the phase, may be used in some embodiments.

Digital oscillator 420 may be used in an OPU, such as OPU 110 and/or 210 to model a periodic function. Digital oscillator 420 may be a straightforward mechanism for solving the relevant differential equations. A system operating digital oscillators analogous to digital oscillator 420 in parallel and in combination with programmable interconnect(s) may more rapidly provide higher precision solutions to complex problems governed by the differential equations. Further, such a system may be built on silicon and/or run at temperatures of at least zero degrees Celsius. Consequently, such a system may be more readily fabricated and utilized than, for example, quantum processors. In addition, communication between digital oscillators 420 and remaining components of the system, such as a CPU and/or GPU may be facilitated. Reduced latency may thus be achieved. Thus performance of a system employing digital oscillator 420 may be improved.

Figure 5:
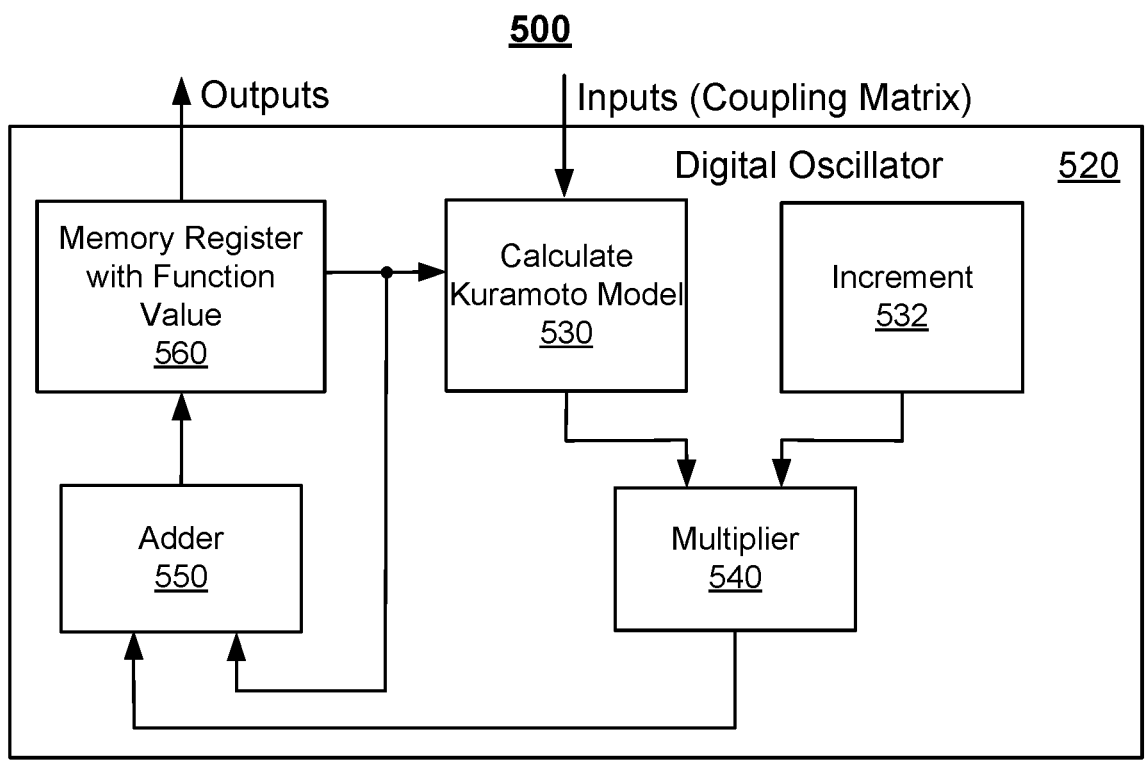
FIG. 5 depicts an embodiment of a digital oscillator.

FIG. 5 depicts a particular digital oscillator 520 that is analogous to digital oscillators 120, 120B and/or 220 and can be used in systems 100 and/or 200. Digital oscillator 520 receives inputs including weighted response from other digital oscillators (not shown in FIG. 5) and outputs a response. The inputs are provided by a programmable interconnect (not shown in FIG. 5) in some embodiments. Digital oscillator 520 is configured to solve a differential equation. In some embodiments, digital oscillator 520 is configured to model a differential equation governing a corresponding LC oscillator in a group of coupled oscillators. Digital oscillator 520 directly models the Kuramoto model of the coupled oscillators. Thus, in some embodiments, digital oscillator 520 is used to model a system governed by/solve the differential equation:

$$\frac{d}{dt}\phi_i(t) = A_c \sum_j J_{ij} \cdot \sin(\phi_i(t) - \phi_j(t)) - A_s \cdot \sin(2\phi_i(t)).$$

In this embodiments, $\phi_i$ is the phase of the $i^{th}$ oscillator in a set of coupled oscillators, $J_{ij}$ is the coupling between the $j^{th}$ oscillator and the $i^{th}$ oscillator, $\phi_j$ is the phase of the $j^{th}$ coupled oscillator, $A_s$ is the magnitude of the injection lock signal, $A_c$ is a multiplier, t is the relevant variable (i.e. time in this case), and the sum over j is over the remaining oscillators. Thus, digital oscillator 520 includes calculator block 530 that calculates the current value of the time derivative of the phase using the Kuramoto model. Calculator block 530 thus includes digital components coupled such that the output provided is the time derivative of the phase for the corresponding input. Digital oscillator 520 also includes increment block 532, which stores the amount by which the particular variable (i.e. time) is incremented. Digital oscillator 520 also includes multiplier 540, adder 550 and memory 550. Memory 550 stores the current value of the phase. In some embodiments, memory 560 is implemented as a register.

In operation, calculator block 530 receives inputs related to the coupling. In some embodiments, the inputs correspond to a coupling matrix including the values of $J_{ij}$. Calculator block 530 utilizes these inputs and the value of the Kuramoto model (i.e. phase of the oscillator) for the previous iteration to calculate the derivative of the value for the current iteration. Using increment 532, multiplier 540 multiplies the derivative of the Kuramoto model for the current iteration by the increment. This amount is added to the value for the previous iteration by adder 550. The resulting value of the Kuramoto model for the current iteration is stored by memory 560. This current value of the phase function is also provided as a response by memory 560.

In other embodiments, digital oscillator 520 utilizes the Kuramoto model in calculator block 530 to determine the current value of the time derivatives corresponding to equations:

$$\frac{ds_i}{dt} = -(\nabla_s V(s,a)) = -\left(2J\hat{s} + h + \frac{1}{4}(\hat{s}^{\circ 3} - \hat{s})\right)$$

$$\frac{da_m}{dt} = a_m K_m(s)^2 = G\left(A\frac{1}{2}(\hat{s}+\hat{1}) - b\right)^2$$

Thus, digital oscillator 520 includes calculator block 530 that includes digital components configured, based on the Kuramoto model, to output the current value of the time derivative for the inputs. In this embodiment, digital oscillator 520 also utilizes increment block 532 to increment time, multiplier 540 to multiply the current value determined via the Kuramoto model with the increment, adder 550 to add this to the previously stored value, and memory 550 to store the current value. Thus, regardless of whether digital oscillator 520 explicitly models phase of coupled oscillators, coupled electrons, a k-SAT problem or other problem, digital oscillator 520 include components connected such that a response corresponding to a solution of the differential equation is output.

Digital oscillator 520 may be used in an OPU, such as OPU 110 and/or 210 to model a periodic or other function. Digital oscillator 520 directly solves the Kuramoto model for a system of coupled oscillators. A system operating digital oscillators analogous to digital oscillator 520 in parallel and in combination with programmable interconnect(s) may more rapidly provide higher precision solutions to complex problems governed by the differential equations. Further, such a system may be built on silicon and/or run at temperatures of at least zero degrees Celsius. Consequently, such a system may be more readily fabricated and utilized than, for example, quantum processors. In addition, communication between digital oscillators 520 and remaining components of the system, such as a CPU and/or GPU may be facilitated. Reduced latency may thus be achieved. Thus performance of a system employing digital oscillator 520 may be improved.

Figure 6:
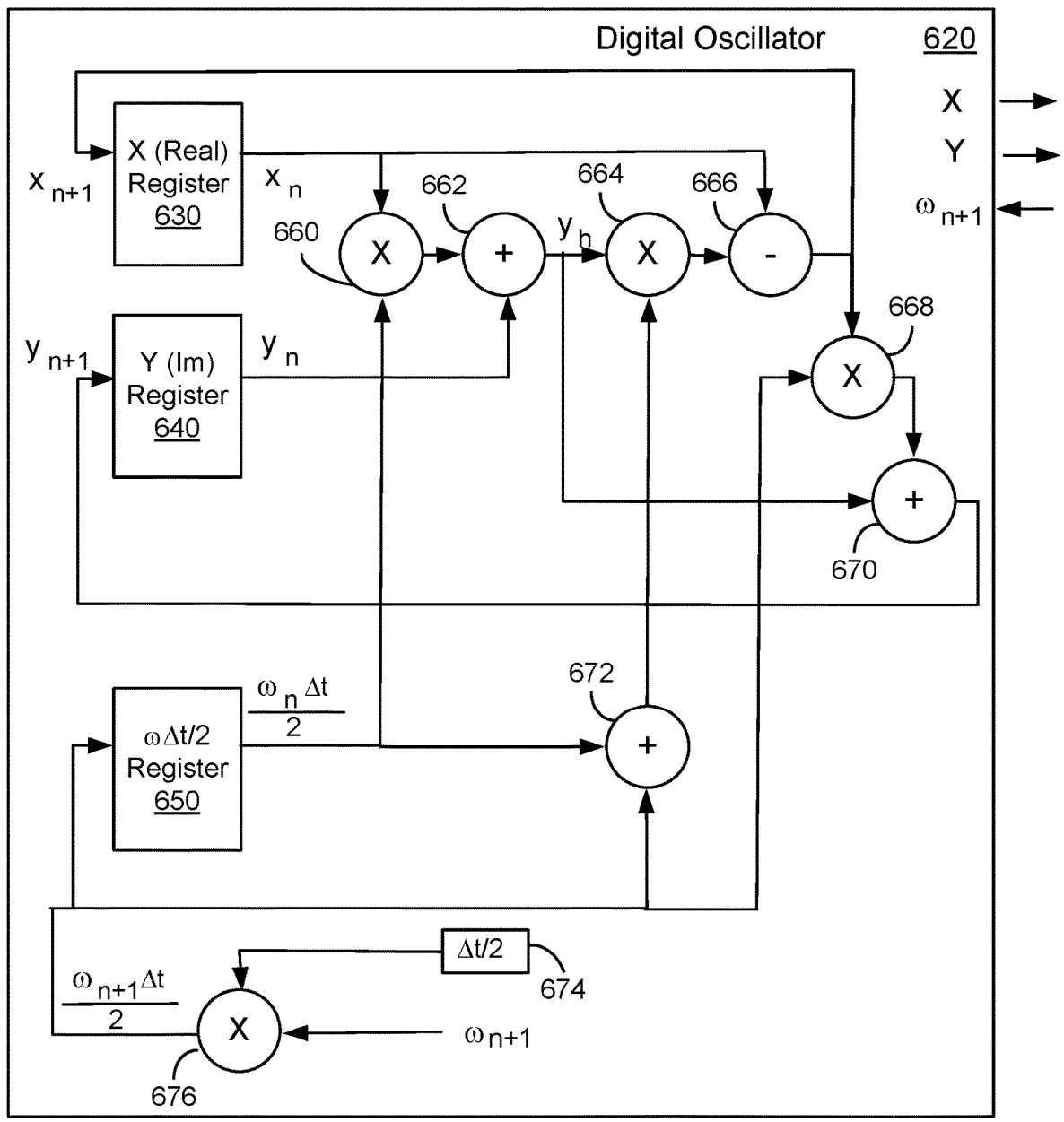
FIG. 6 depicts an embodiment of a digital oscillator.

FIG. 6 depicts a particular digital oscillator 620 that is analogous to digital oscillators 120, 120B and/or 220 and can be used in systems 100 and/or 200. Digital oscillator 620 may be an injection locked oscillator using a sub-harmonic injection locking (SHIL) mechanism. Digital oscillator 620 models evolution of a periodic, complex-valued state by modeling the differential equations governing the state. The state value can be represented as two numerical values: x and y. One value (x) represents the real part of the state, while the other value (y) represents the imaginary part of the state. The complex-valued state, z(t), may be viewed as approximating a point on the unit circle, $e^{i\theta}$, that rotates continuously and is, therefore, periodic. The complex-valued state rotates at a time-varying instantaneous angular frequency $\omega(t)$. Thus, the time derivative of state variable $z(t)$ is given by $i\omega(t)t$. For a set of coupled oscillators, the instantaneous angular frequency of $k^{th}$ digital oscillator 620 is given by $\omega_k(t)$. The time-derivative of the state variable $z_{k(t)}$ for the $k^{th}$ digital oscillator 620 corresponds to the equation $\dot{z}_k = i\omega_k(t)t$. Thus, operation of digital oscillator 620 is described in the context of the $k^{th}$ digital oscillator 620 in a set of multiple coupled digital oscillators.

To compute $z_k(t)$ at a particular time given an initial value at time $t_0$, the equation for $\dot{z}_k$ is integrated from $t_0$ to t. To approximate this integration, digital oscillator 620 computes the complex-valued state corresponding to successive discrete time steps at times $t=n\Delta t$ for integer values of n. In some embodiments, the computation for each digital oscillator 620 in a set of coupled oscillators is based on a common time-increment, $\Delta t$, which is a parameter of the system. For each digital oscillator 620, the instantaneous angular frequency for that oscillator, $\omega_{k,n+1}$, is computed to update the state from iteration n to step n+1. Using this instantaneous angular frequency, digital oscillator 620 computes the n+1 state $z_{k,n+1}$ from the previous state $z_{k,n}$.

To begin the overall process, the state of each digital oscillator 620 is initialized to a value corresponding to a point uniformly distributed on the unit circle (that is, $e^{i\theta}$, where $\theta$ is uniformly distributed in the range $-\pi<\theta\leq\pi$). In addition to the digital oscillators 620 used to represent the state of each Ising-model variable, a distinct reference oscillator is used for the SHIL computation. In some embodiments, this reference oscillator is initialized to a known value of 1. This value is arbitrary and may be either a known value or a random value somewhere approximately on the complex unit circle.

Given the values of $\omega_{k,n}$ and $\omega_{k,n+1}$ for digital oscillator 620, in some embodiments, the complex state value is updated using a method similar to the "leapfrog" method, which results in a stable rotation around the unit circle under a broad range of conditions. Specifically, the update of the state of each digital oscillator 620 may be performed as follows. The complex state of digital oscillator 620 at step n is as $z_n = x_n + iy_n$, with x and y being the real and imaginary parts, respectively, as indicated above. Although the index k indicating which oscillator is being referred to is omitted, the following equations are utilized for each digital oscillator 620:

$$y_h = y_n + \omega_n x_n \frac{\Delta t}{2}$$

$$x_{n+1} = x_n - (\omega_n + \omega_{n+1}) y_h \frac{\Delta t}{2}$$

$$y_{n+1} = y_h + \omega_{n+1} x_{n+1} \frac{\Delta t}{2}$$

Thus, the real and imaginary values of the state for the current iteration ($x_{n+1}$ and $y_{n+1}$) are determined in digital oscillator 620. These values of x and y are stored in registers 630 and 640, respectively, as well as output as responses. Each register 630, 640 and 650 may be connected to a common clock, which synchronously updates the register values from the corresponding input on each clock tick. The angular frequency, $\omega_{n+1}$, for the current iteration is provided as an input to digital oscillator 620. The value $\Delta t$ is a constant that is common across all oscillators 620 in some embodiments. Memory 674 stores the time increment. In some embodiments, the numerical value $\Delta t$ is chosen to be a power of two, allowing multiplication by $$\frac{\Delta t}{2}$$

to be performed simply, such as a bit-shift in the case of a fixed-point representation.

In some embodiments, to perform the iteration, half of the time increment from memory 674 is multiplied by the angular frequency for the current iteration by multiplier 676 to provide an angle. This angle ($w_{n+1}\Delta t/2$) is stored in register 650 and summed with the corresponding angle for the previous iteration ($w_n\Delta t/2$) by adder 672. The x value for the previous iteration ($x_n$) from register 630 is multiplied by the angle for the previous iteration ($w_n\Delta t/2$) at multiplier 660 and summed with the y value for the previous iteration ($y_n$) by adder 662. The resultant is $y_h$. Here, $y_h$ can be thought of as representing the imaginary value of the state at an intermediate point approximately halfway between iteration n and iteration n+1. The value $y_h$ is multiplied by the output of adder 672 ($w_{n+1}\Delta t/2+w_n\Delta t/2=(w_{n+1}+w_n)\Delta t/2$) by multiplier 664. The value of the real part of the state from the previous iteration ($x_n$) is removed by subtracter 666 and the output is stored in register 630 as the value of the real part of the state at the current iteration ($x_{n+1}$). The output subtracter 666 is also multiplied by the angle $w_{n+1}\Delta t/2$ at multiplier 668. The output of multiplier 668 is added to $y_h$ at 670. This yields the current value of the imaginary part of the state, $y_{n+1}$, which is stored in register 640 and output. Thus, digital oscillator 620 provides outputs based on the equations indicated above.

For digital oscillators 620, a reference oscillator is also used. For the reference oscillator, the instantaneous angular frequency is constant, with a value $\omega_{ref}$. In other embodiments, other forms of integration that are stable for an oscillator, such as those with higher order terms, may be used in lieu of the method described herein.

For each digital oscillator 620 (other than the reference oscillator), the instantaneous angular frequency is updated on each time step (i.e. each iteration). The instantaneous angular frequency corresponds to a constant nominal frequency $\omega_0$, modified by time-varying components due to the coupling between each oscillator and some or all other oscillators, and due to the coupling with the reference oscillator for the SHIL operation. In some embodiments, a random component is also included in computing the instantaneous angular frequency.

At an iteration, n, the angular frequency for oscillator k may be governed by:

$$\omega_{k,n} = \omega_0 + \sum_j \omega_{j,k,n} + \omega_{S,k,n} + \omega_{N,k,n}$$

Here, $\omega_{j,k,n}$ is the relative instantaneous angular frequency due to the oscillator-to-oscillator coupling from oscillator j, $\omega_{S,k,n}$, is that due to the SHIL operation. The frequency $\omega_{N,k,n}$ is that due to the noise component and may be omitted. In some embodiments, the coupling between digital oscillators 620 is derived from the coupling computed in the Kuramoto model of couple oscillators. Specifically, in that model, the coupling from oscillator j to oscillator k is proportional to $\sin(\theta_k-\theta_j)$, where $\theta_k$ and $\theta_j$ are the instantaneous phases of oscillators k and j, respectively, with a proportionality constant of $-J_{kj}$. Here, $J_{kj}$ corresponds to the corresponding entry of the coupling matrix J that defines the Ising model associated with the computation. Other coupling may be used in some embodiments. At iteration n, the resulting component of the instantaneous frequency associated with oscillator-to-oscillator coupling is $\omega_{j,k,n}=-A_J(t)J_{kj}\sin(\theta_{k,n}-\theta_{j,n})$. Here, $A_J(t)$ is a scale factor that in some embodiments is time varying. In some embodiments, rather than explicitly computing the instantaneous phases and the sine function, the complex states are used directly to determine the equivalent value (assuming the state values, z, are approximately on the complex unit circle):

$$\omega_{j,k,n}=-A_J(t)J_{kj}\text{Im}(z_{k,n}z_{j,n}^*)$$

Here, Im( ) corresponds to the imaginary component of the value and * represents the complex conjugate.

The second component for instantaneous angular frequency is due to the SHIL operation. Stated differently, the second component is used for injection locking. Here, digital oscillators 620 are coupled to a single fixed-frequency oscillator generating a frequency twice the nominal frequency of the other oscillators (that is, $2\omega_0$). In some embodiments, another frequency may be used. This frequency is coupled to the other oscillators via a function referred to as a perturbation projection vector (PPV). The PPV represents a model of small-valued disturbances of a physical or electrical oscillator, which corresponds to the linearized effect of the disturbing signal on the phase of the oscillator. The effect of this signal is modeled as a function of the phase of the oscillator being disturbed. For the purpose of locking each oscillator of the system to one of two phases, this function includes at least a significant second harmonic as a function of phase. Thus, the PPV includes at least a component proportional to $\sin(2\theta)$. The resulting effect is a component of the instantaneous frequency that is proportional to the product of the PPV as a function of that oscillator's phase, and the SHIL oscillator, producing a signal at frequency $2\omega_0$. That is, $$\omega_{S,k,n}=A_S(t)PPV_{k,n}\text{SHIL}_n=A_S(t)\sin(2\theta_{k,n})\sin(2\omega_0 t+\varphi).$$

Here, $A_s(t)$ is the coupling amplitude that may vary with time; $\theta_{k,n}$ is the instantaneous phase of oscillator k at time-step n; $\sin(2\omega_0 t+\varphi)$ is the SHIL signal applied to all digital oscillators 620, which is at a fixed frequency, and may have an arbitrary initial phase, $\varphi$, and $t=n\Delta t$. In some embodiment, the PPV function is determined directly from the complex oscillator state without explicitly using the instantaneous phase angle or the sine function. Specifically, $$PPV_{k,n}=2\text{Re}(z_{k,n})\text{Im}(z_{k,n})$$

Here, Re( ) is the real part of the complex argument and Im( ) is the imaginary part. For z values approximately on the complex unit circle, this is equivalent to $\sin(2\theta_{k,n})$. However, in some embodiments, the PPV value is either $PPV_{k,n}=2\text{Re}(z_{k,n})^2-1$ or $PPV_{k,n}=2\text{Im}(z_{k,n})^2-1$. These alternatives are equivalent to utilizing $\cos(2\theta_{k,n})$ or $-\cos(2\theta_{k,n})$, respectively, which are similar to $\sin(2\theta_{k,n})$, but phase shifted by $$\frac{\pi}{2}.$$

The result of using these alternatives is a phase shift of the resulting bistable states by the corresponding amounts.

In some embodiments, the SHIL signal is determined using a single complex-valued reference oscillator operating at the fixed angular frequency $\omega_{ref}=\omega_0$. The SHIL signal is determined from the state of this oscillator as the square of the state. That is, $$\text{SHIL}_n=\text{Im}(z_{ref,n}^2)$$

The resulting component of the instantaneous angular frequency is:

$$\omega_{S,k,n}=A_S'(t)\text{Re}(z_{k,n})\text{Im}(z_{k,n})\text{Im}(z_{ref,n}^2)$$

Here, $A_S'(t)=2A_S(t)$, incorporating the factor of two. In some embodiments, the SHIL signal is generated by a reference oscillator operating at the fixed angular frequency $\omega_{ref}=2\omega_0$. In this case, the imaginary part of the complex state is used directly as the SHIL signal.

In some embodiments, a noise component is included in the instantaneous frequency of each oscillator. In such cases, the noise signal for each time step for each oscillator is an independent random sample distributed approximately as a normal distribution. That is, the resulting noise component of the instantaneous angular frequency is computed as:

$$\omega_{N,k,n} \sim \mathcal{N}(0,\sigma_N^2)$$

Here, $\sigma_N^2$ is the noise variance, which may vary as a function of time.

Digital oscillator 620 performs by a particular number of iterations that may be fixed or may vary. For example, the number of iterations may be varied depending on the specific parameters of the computation or on the progress of the computation. After the final iteration, the binary result associated with the final result computation may be determined. This value may also be computed at any or all intermediate steps. In some embodiments, the binary is determined from the state of each oscillator, $z_k$, with respect to the state of the reference oscillator $z_{ref,n}$ as follows:

$$b_{k,n} = \mathbb{I}(\text{Im}(z_{ref,n}^* z_{k,n}) \geq 0)$$

Here, $z_{ref,n}^*$ is the complex conjugate of the reference oscillator state, which is operating at frequency $\omega_0$, at the current time step; and $\mathbb{I}(\ )$ is an indicator function, taking the value 1 if the enclosed statement is true, or −1 if the enclosed statement is false.

In some embodiments, the digital oscillator 620 in a system of coupled oscillators may be implemented as a synchronous fully parallel implementation. In this embodiment, each digital oscillator 620 may be a separate finite state machine, coupled in a synchronous manner through the specified coupling terms. The state values for each digital oscillator 620 are stored in distinct registers, and directly coupled to the computing elements. In a synchronous manner based on a common clock, all parallel state machines update their state on each discrete time step. The state of each digital oscillator 620 includes the real and imaginary components of the oscillator state, x and y; and the most recent instantaneous angular frequency, co.

In some embodiments, digital oscillator 620 is fully connected to other digital oscillators. The connectivity between digital oscillators 620 may be implemented in the form of a crossbar configuration. In other embodiments, the oscillator-to-oscillator coupling is limited to a restricted connection configuration. Stated differently, digital oscillator 620 is desired to be sparsely connected to other digital oscillators. Thus, the connectivity is arranged accordingly. In some embodiment, digital oscillators 620 (other than the reference oscillator) are grouped into clusters of more than one digital oscillator 620. In some such embodiments, each cluster shares a single implementation of the computation elements and stores the state in an addressable register file or memory. In some such embodiments, the computation for each cluster is performed in parallel with that of the other clusters. However, within a single cluster, the computation for each oscillator is performed sequentially. In this case, the addressing sequence of the memories may limit the structure of the connectivity between oscillators to ensure that the state values from adjacent oscillators are available to each computation unit at the time they are needed. In some embodiments, the state variables are stored in digital oscillator 620 as floating-point values and the computation performed on these values uses floating-point arithmetic. In other embodiments, the state variables are stored in a fixed-point representation and the computation on these values uses fixed-point arithmetic. In this case, additional scaling operations may be required to ensure values are within a specified numerical range.

In some embodiments of digital oscillator 620, the iteration is performed such that the nominal frequency of each oscillator is zero (i.e., $\omega_0=0$). Such embodiments correspond closely to a particular implementation of the Kuramoto model. In this embodiment, the digital oscillators 620 are as previously described and depicted. However, the computation of the instantaneous angular frequency differs. The instantaneous angular frequency is computed without the $\omega_0$ term, as:

$$\omega_{k,n} = \sum_j \omega_{j,k,n} + \omega_{S,k,n} + \omega_{N,k,n}$$

In this embodiment, the $\omega_{j,k,n}$ and $\omega_{N,k,n}$ terms are as described above. The $\omega_{S,k,n}$ term differs in that there is no reference oscillator. Instead, this term is directly proportional to the PPV value, $\sin(2\theta_{k,n})$. In this embodiment, this term may be:

$$\omega_{S,k,n} = A_S(t)\text{Re}(z_{k,n})\text{Im}(z_{k,n})$$

As there is no reference oscillator, the resulting binary value is computed by comparing with the known bistable phase states, which in this case, corresponds to:

$$b_{k,n} = \mathbb{I}(\text{Im}(z_{k,n}) \geq 0)$$

Digital oscillator 620 may be used in an OPU, such as OPU 110 and/or 210 to model a periodic function. Because it models the real and imaginary portions of the state variable, digital oscillator 620 may be more readily configured than, for example, a digital oscillator which directly models a sine function. A system operating digital oscillators analogous to digital oscillator 620 in parallel and in combination with programmable interconnect(s) may more rapidly provide higher precision solutions to complex problems governed by the differential equations. Further, such a system may be built on silicon and/or run at temperatures of at least zero degrees Celsius. Consequently, such a system may be more readily fabricated and utilized than, for example, quantum processors. In addition, communication between digital oscillators 620 and remaining components of the system, such as a CPU and/or GPU may be facilitated. Reduced latency may thus be achieved. Thus performance of a system employing digital oscillator 620 may be improved.

Figure 7:
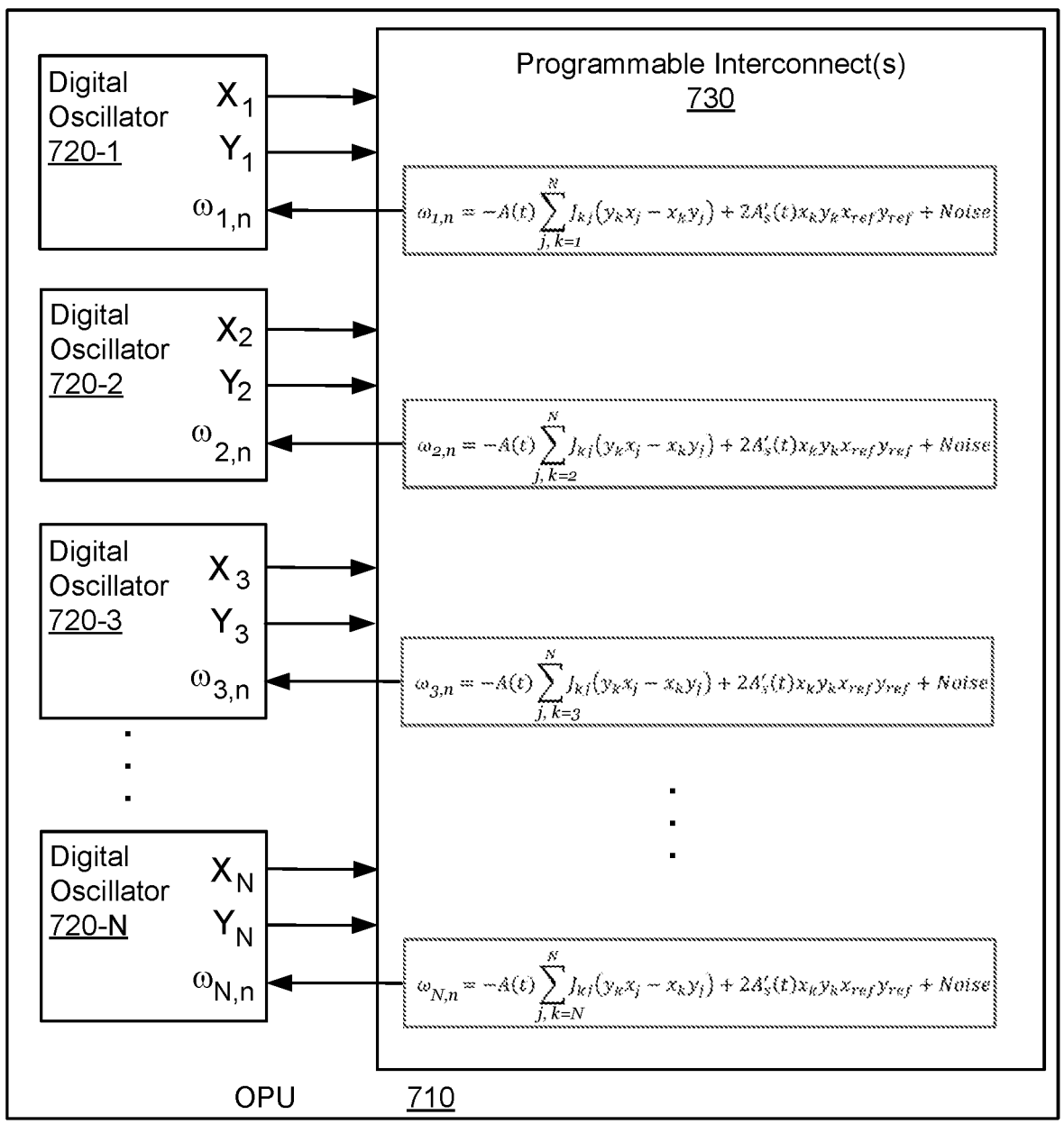
FIG. 7 depicts an embodiment of programmable interconnects usable in conjunction with digital oscillators.

FIG. 7 depicts an embodiment of system 700 usable in conjunction with a digital oscillator such as digital oscillator 620 and that may be used in solving problems such as those described herein and/or other fields. System 700 is analogous to system 100 and includes OPU 710. OPU 710 is analogous to OPU 110. OPU 710 includes programmable interconnect 730 and digital oscillators 720-1 through 720-N (collectively digital oscillators 720/generically digital oscillator 720). Programmable interconnect 730 is analogous to programmable interconnect 130. Digital oscillators 720 are analogous to digital oscillators 120, 120B and/or 120C. Digital oscillators 720 may also be analogous to digital oscillator 620 and thus receive as an input the current value of the angular frequency. FIG. 7 indicates that in addition to weighting the responses ($X_i$, $Y_i$) from digital oscillators 720 and selectably coupling digital oscillators 720, programmable interconnect 730 also provides the angular frequency for the current iteration. Thus, programmable interconnect 730 performs multiple functions.

Programmable interconnect 730 provides weights for and selectably couples digital oscillators 720. The combination of digital oscillators 720 coupled via programmable interconnect 730 digitally models coupled differential equations, coupled periodic functions and/or the corresponding coupled systems. Digital oscillators 720 may function substantially in parallel to digitally solve a set of coupled differential equations. System 700 may provide benefits analogous to those of system 100 including but not limited to more rapidly providing improved precision solutions to complex problems. Thus performance of system 700 may be improved.

Figure 8:
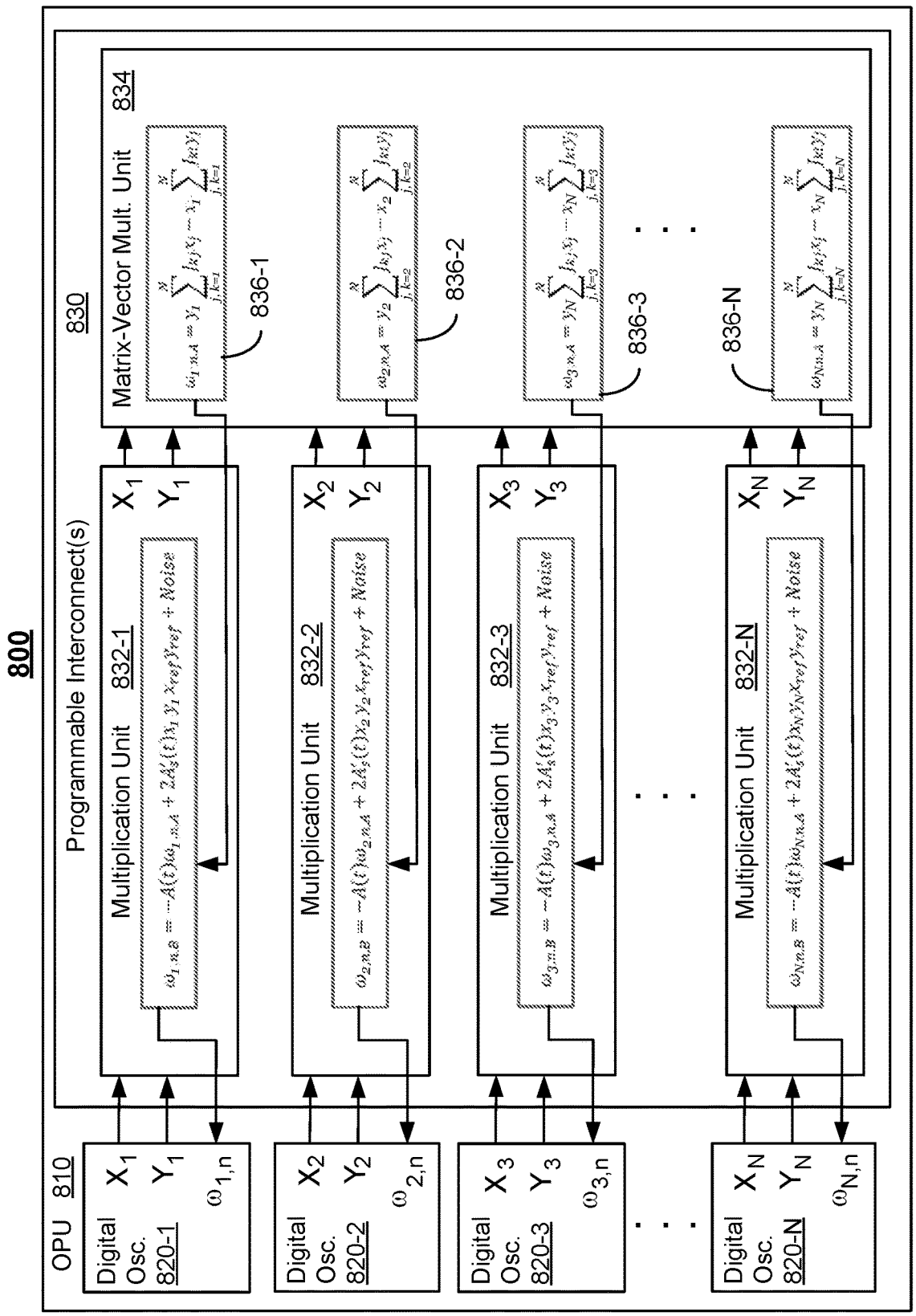
FIG. 8 depicts an embodiment of programmable interconnects usable in conjunction with digital oscillators.

FIG. 8 depicts an embodiment of a system 800 usable in conjunction with a digital oscillator such as digital oscillator 620 and that may be used in solving problems such as those described herein and/or other fields. System 800 is analogous to system 100 and includes OPU 810. OPU 810 is analogous to OPU 110 and/or 700. OPU 810 includes programmable interconnect 830 and digital oscillators 820-1 through 820-N (collectively digital oscillators 820/generically digital oscillator 820). Digital oscillators 820 are analogous to digital oscillators 120, 120B, and/or 120C. Digital oscillators 820 are also analogous to digital oscillator 620 and thus receive as an input the current value of the angular frequency.

Programmable interconnect 830 is analogous to programmable interconnect 130 and to programmable interconnect 730. Thus, in addition to weighting the responses ($X_i$, $Y_i$) from digital oscillators 820 and selectably coupling digital oscillators 820, programmable interconnect 830 provides the angular frequency for the current iteration. Thus, programmable interconnect 830 performs multiple functions. Programmable interconnect 830 breaks the calculation of the angular frequency into two sections performed by multiplication units 832-1 through 832-N and matrix-vector multiplier 834. The combination of digital oscillators 820 coupled via programmable interconnect 830 digitally models coupled differential equations, coupled periodic functions and/or the corresponding coupled systems. Digital oscillators 820 may function substantially in parallel to digitally solve a set of coupled differential equations. System 800 may provide benefits analogous to those of system 100 including but not limited to more rapidly providing improved precision solutions to complex problems. Thus performance of system 800 may be improved.

Figure 9:
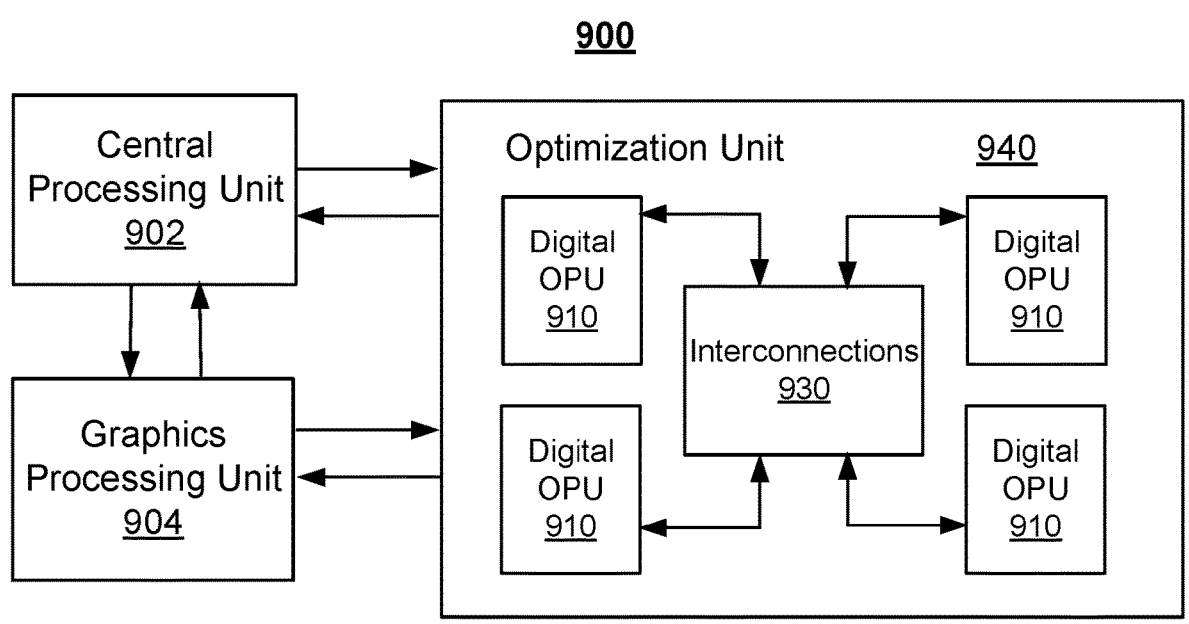
FIG. 9 depicts an embodiment of a system utilizing multiple optimization processing units including digital oscillators.

FIG. 9 is a diagram depicting an embodiment of system 900 usable in providing solutions to problems described herein and/or other fields. For clarity, only certain components of system 900 are depicted. System 900 is analogous to system 100. Thus, system 900 includes CPU 902 and GPU 904 in addition to optimization unit 940. Optimization unit 940 includes interconnects 930 and multiple OPUs 910. Although system 900 is described in the context of a CPU 902 and a single GPU 904, in some embodiments, system 900 may include multiple CPUs and/or multiple GPUs. In some embodiments, CPU 902 and/or GPU 904 may be omitted.

Optimization unit 940 of system 900 includes multiple OPUs 910 interconnected via interconnects 930. Each OPU 910 is analogous to OPU 110, 210, 710 and/or 810. Thus, each OPU 910 includes digital oscillators and programmable interconnects (not shown) such as those described herein. Interconnects 930 may sparsely or fully connect OPUs 910. Further, the connections between OPUs 910 may be programmable. In some embodiments, interconnects 930 operate in an analogous manner to programmable interconnects 130, but couple and weight outputs of OPUs 910 instead of individual digital oscillators.

System 900 may provide benefits analogous to those of system 100 including but not limited to more rapidly providing improved precision solutions to complex problems. Further, system 900 allows for the use of multiple OPUs 910 in solving problems. Thus performance of system 900 may be improved.

In addition to providing solutions to complex problems, digital oscillators such as those described herein may be used in logic applications. FIGS. 10A-12 depict embodiments of techniques for providing reversible logic utilizing digital oscillators.

Figure 10A:
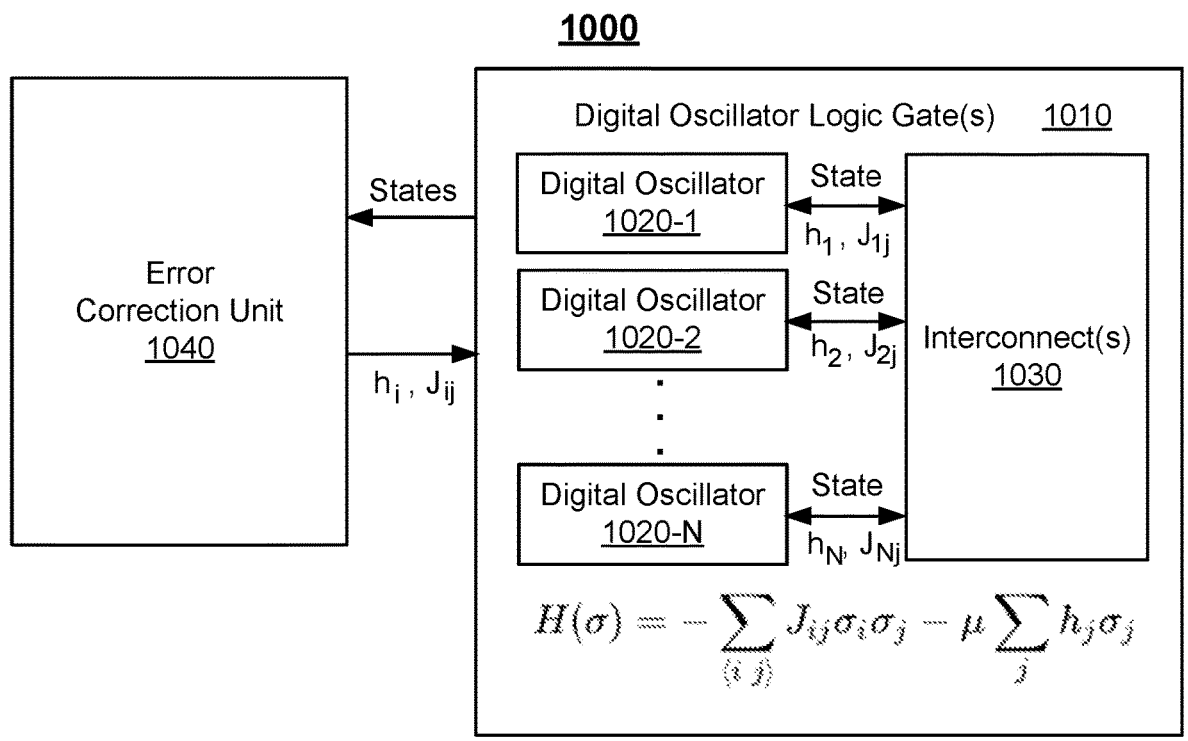
FIGS. 10A-10B depict an embodiment of a system for performing logic operations and utilizing oscillators and error correction.
Figure 10B:
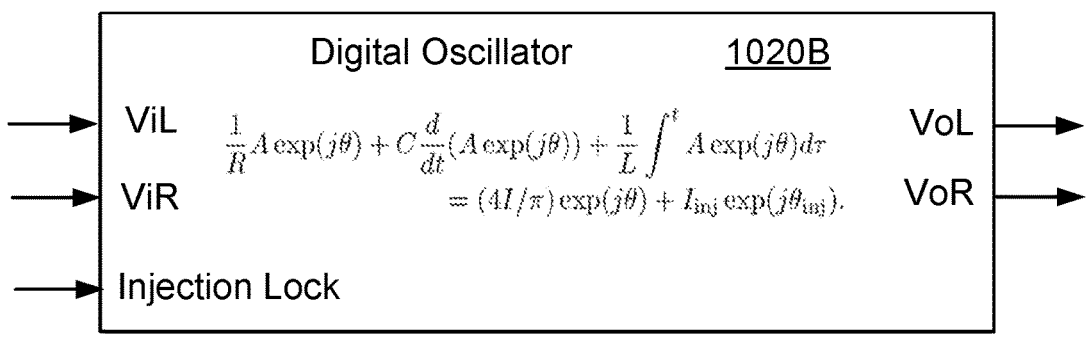

FIGS. 10A-10B depict an embodiment of system 1000 for performing logic operations and utilizing oscillators and error correction. For clarity, only portions of system 1000 are shown. FIG. 10A depicts system 1000 including logic gate(s) 1010 and error correction unit 1040. FIG. 10B depicts an embodiment of digital oscillator 1020B usable in logic gate(s) 1010. Logic gate(s) 1010 include interconnect 1030 and digital oscillators 1020-1, 1020-2 through 1020-N (collectively digital oscillators 1020/generically digital oscillator 1020). Thus, digital oscillators 1020 are configured to perform one or more logic operations. For example, digital oscillators 1020 may be configured to perform a logical OR operation. Thus, digital logic gate(s) 1010 form an OR gate in such a case. In other embodiments, digital oscillators 1020 may be configured to carry out one or more other and/or additional logical operations. Although shown as digital oscillators in other embodiments, oscillators 1020 may be analog oscillators. Other mechanisms for determining the connection coefficients may be used in other embodiments.

In configuring digital oscillators 1020 to carry out the logical operation(s), digital oscillators 1020 are coupled through interconnect(s) 1030. In some embodiments, interconnects 1030 are merely electrical connections between and to digital oscillators 1020. For example, the output of oscillator 1020-1 may be connected to the input of another digital oscillator 1020-2. In some embodiments, interconnects 1030 may be programmable or otherwise configured to provide additional functionality. Interconnects 1030 receive the output from (e.g. the states of) digital oscillators 1020 and provide the output from the appropriate digital oscillator(s) 1020 as the resultant of the logical operation(s). Interconnects also provide the connection coefficient(s), $h_i$, (for the $i^{th}$ digital oscillator 1020) and/or $J_{ij}$ (between the $i^{th}$ and $j^{th}$ oscillators 1020). These connection coefficients are received from error correction unit 1040 and provided to one or more of digital oscillators 1020 by interconnect(s) 1030. In some embodiments, the value(s) of the connection coefficients are determined by error correction unit 1040. In some embodiments, the value(s) of the connection coefficients are determined by interconnects 1040. Thus, digital oscillators 1020 in combination with interconnect(s) 1030 may be viewed as governed by the Ising Hamiltonian:

$$H(\sigma) = -\sum_{(ij)} J_{ij}\sigma_i\sigma_j - \mu\sum_j h_j\sigma_j$$

Here, the connection coefficient(s), $h_i$ and/or $J_{ij}$ are tuned provided based on error correction unit 1040.

Although described in the context of reversible logic operations, digital oscillators 1020 can more generally viewed as modeling digitally model periodic (or wave) functions and/or the corresponding systems. Digital oscillators 1020 may thus model a system governed by one or more differential equations. Stated differently, a digital oscillator 1020 may be a differential equation solver for a periodic differential equation and/or a differential equation solver for the differential equation(s) governing particular systems. For example, a digital oscillator 1020 may model an analog oscillator, such as an inductive-capacitive (LC) or resistive-inductive-capacitive (RLC) circuit. Such a digital oscillator 1020 may be viewed as solving the differential equation for an LC or RLC circuit. A digital oscillator 1020 may model Schrodinger's equation (i.e. the differential equation related to the Hamiltonian). Thus, digital oscillator 1020 may solve Schrodinger's (differential) equation to find the ground states of the electron. Digital oscillator 1020 may model the portion of the Ising Hamiltonian for a spin in a system of coupled spins. Thus, digital oscillator 1020 may be used to model a particular system governed by a differential equation. Digital oscillator 1020 may employ various mechanisms including but not limited to Euler's method and the Kuramoto model to solve such differential equations. In some embodiments, digital oscillator 1020 includes or consists of digital circuit components that are utilized at temperatures at or above zero degrees Celsius (e.g. room temperature or above). In some embodiments, digital oscillators 1020 may include or consist of circuit components formed on silicon wafers as part of an integrated circuit.

The combination of digital oscillators 1020 coupled via interconnect(s) 1030 digitally models coupled differential equations, coupled periodic functions and/or the corresponding coupled systems. For example, coupled digital oscillators 1020 may be used to model the Ising Hamiltonian configured to perform the desired logic operation(s). In some embodiments, digital oscillators 1020 in combination with interconnect(S) 1030 model a system of coupled analog oscillators, such as coupled LC circuits and/or coupled RLC circuits. Thus, digital oscillators 1020 in conjunction with interconnect(s) 1030 may be used to model a particular system governed by coupled differential equations. Digital oscillators 1020 may employ various mechanisms including but not limited to Euler's method and the Kuramoto model. Digital oscillators 1020 are thus configured to provide, based on data input to digital oscillators 1020 and connection coefficients provided by interconnect(s) 1030, responses that are probabilistic and periodic in nature. For example, the responses may be based upon the phases corresponding to digital oscillator 1020 at the particular time the oscillator(s) are sampled.

In some embodiments, digital oscillators 1020 are injection locked digital oscillators. Injection locked digital oscillators 1020 may be more likely to synchronize to reach a stable state for the combination of digital oscillators 1020. In some embodiments, each injection locked digital oscillator 1020 may settle in one of two states. For example, the phases of the oscillators may be considered to be 0° or 180° and may differ based upon initial conditions for the oscillator and/or the time at which the oscillator is sampled. The phases of these oscillators may be used to model equations, such as the Hamiltonian (e.g. the Ising Hamiltonian) used for logical operations. The phases of these oscillators 1020 may also be used to model the corresponding differential equations for the phases of oscillators used in providing a solution to the Ising Hamiltonian. In some embodiments, injection locked digital oscillators are configured by providing injection lock signals to digital oscillators 1020. The frequency of such injection lock signals is greater than the frequency of the corresponding digital oscillator 1020. In some embodiments, the injection lock signal is at 1.5 multiplied by the frequency and not more than 2.5 multiplied by the frequency of the corresponding digital oscillator 1020. For example, in some embodiments, the injection lock signal is at nominally twice the frequency of the corresponding digital oscillator 1020. Thus, injection locked digital oscillators 1020 may synchronize to provide a stable set of states for digital oscillators 1020 coupled via programmable interconnect 1030.

FIG. 10B depicts a particular digital oscillator 1020B of digital oscillators 1020. In the embodiment shown, digital oscillator 1020B is an injection locked digital oscillator. Thus, digital oscillator 1020B receives an injection lock signal. In some embodiments, the injection lock signal has a frequency that is nominally twice the modeled oscillator frequency. The injection lock signal assists in syncing digital oscillators 1020 to provide the solution to the coupled differential equations (or coupled system) being modeled. Digital oscillator 1020B also receives inputs ViL and ViR and provides outputs VoL and VoR. Inputs ViL and ViR correspond to connection coefficients provided by interconnect(s) 1030 and outputs of other digital oscillators 1020. Outputs VoL and VoR are outputs provided by digital oscillator 1020B. In some embodiments, digital oscillator 1020B is configured to solve a differential equation governing a corresponding analog LC oscillator. Thus, in some embodiments digital oscillator 1020B is configured to solve the following equation or its analog:

$$\frac{1}{R} A\exp(j\theta) + C\frac{d}{dt}(A\exp(j\theta)) + \frac{1}{L}\int^t A\exp(j\theta)d\tau =$$
$$(4I/\pi)\exp(j\theta) + I_{inj}\exp(j\theta_{inj}).$$

In the above equation, A is a scale factor, C is the capacitance, R is the resistance, L is the inductance, $I_{inj}$ is the amplitude of the injection locking signal, I is the current and θ is the phase of the oscillator. Digital oscillator 1020B may thus be viewed as modeling a particular oscillating LC circuit that is coupled with other oscillators. In some embodiments, for example, digital oscillator 1020B may utilize Euler's method (described herein), the Kuramoto model (described herein) to solve the above differential equation and model the oscillators. In some embodiments, other differential equations may be modeled.

Logic gate(s) 1010 perform logical operations, but may result in errors. Consequently error correction unit 1040 is utilized. Error correction unit 1040 samples the outputs of digital oscillators 1020 (i.e. the states of digital oscillators 1020) as well as the inputs to digital oscillators 1020. Using the inputs to and states of digital oscillators 1020, error correction unit 1040 determines whether errors exist in the logical operation(s) performed by logic gate(s) 1010. For example, error correction unit 1040 may compare the input(s) to and output(s) of each logic gate in logic gate(s) 1010 to a truth table for the corresponding logic gate. If the input(s) and output(s) match the truth table, then error correction unit 1040 takes no action. If, however, there is a mismatch, an error is detected. In response, error correction unit 1040 adjusts the values of the connection coefficient(s) for at least one of digital oscillators 1020. Thus, error correction nit tunes the connection coefficient(s) for one or more digital oscillators 1020 for reduced error operation. For example, the connection coefficient(s) may be pinned to values corresponding to a logical "1" or logical "0". Tuning the connection coefficient(s) forces digital oscillators 1020 to provide a different output. Thus, errors may be corrected.

Using system 1000, reversible logic gates 1010 may be provided. Consequently, system 1010 may be used in complex operations such as factoring. Further, errors that would otherwise be present may be corrected. As a result, system 1000 has the desired accuracy. Performance may thus be improved.

Figure 11:
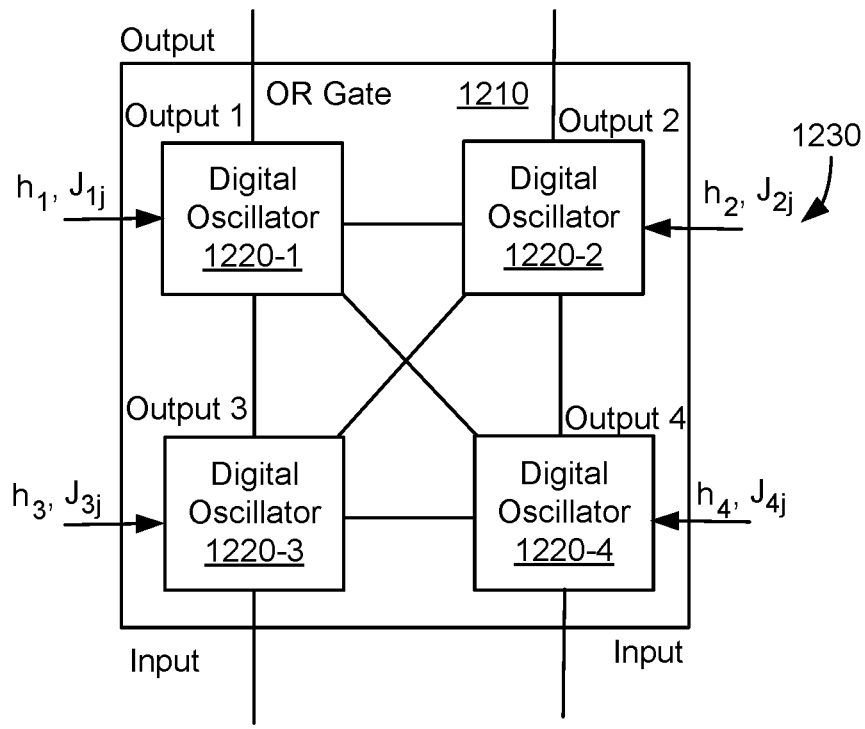
FIG. 11 depicts an embodiment of a system for performing logic operations and utilizing oscillators and error correction.
Figure 11:
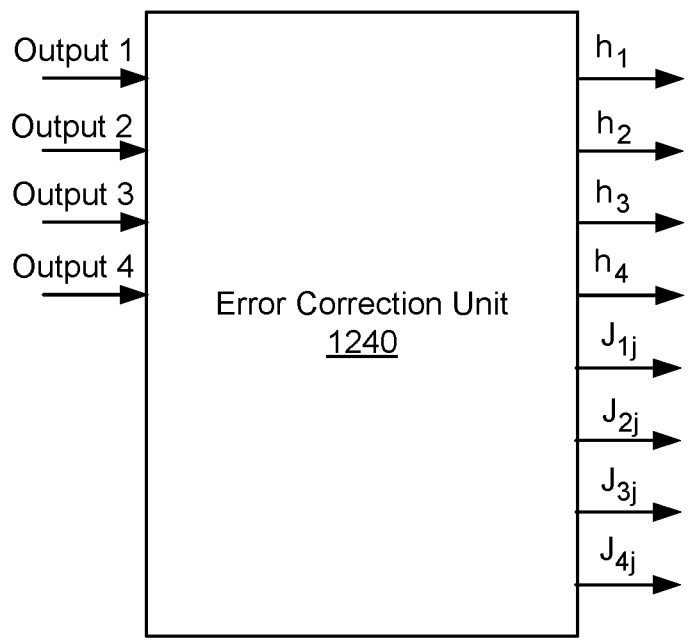

FIG. 11 depicts system 1200 for carrying out a particular logic operation utilizing oscillators and error correction. System 1200 is analogous to system 1000. System 1200 includes logical OR gate 1210 analogous to logic gate(s) 1010 and error correction unit 1240 analogous to error correction unit 1040. Logical OR gate 1210 includes digital oscillators 1220-1, 1220-2, 1220-3 and 1220-4 (collectively digital oscillators 1220/generically digital oscillator 1220). Thus, digital oscillators 1220 are configured to carry out a logical OR operation. Logical OR gate 1210 also includes interconnects 1230 between individual digital oscillators 1220 and between digital oscillators 1220 and error correction unit 1240. In the embodiment shown, interconnects 1230 between individual digital oscillators 1220 are shown as lines. The interconnects between error correction unit 1240 and digital oscillators 1220 are shown as arrows to and from error correction unit 1240. Logic gate 1210 can be described by the Ising Hamiltonian above, where $J_{ij}$ and $h_i$ are the connection coefficients.

Digital oscillators 1220 coupled by interconnects 1230 perform a logical OR operation. However, as indicated above, without more, logical OR gate 1210 may be subject to errors. Consequently, error correction unit 1240 is used. Error correction unit 1240 samples the states of digital oscillators 1220 (output 1, output 2, output 3 and output 4) as well as the inputs to digital oscillators 1220. By comparing the output of logical OR gate 1210 to the expected output(s) for the given inputs, error correction unit 1240 detects whether an error has occurred. If no error is detected, then error correction unit 1240 takes no action. Thus, logical OR gate 1210 operates normally. If, however, an error is detected, then error correction unit 1240 takes action. Error correction unit 1240 tunes the connection coefficient(s) for one or more digital oscillators 1220. Thus, $h_i$ and/or $J_{ij}$ may be adjusted. For example, the connection coefficient(s) may be pinned to values corresponding to a logical "1" or logical "0". Tuning the connection coefficient(s) forces digital oscillators 1220 to provide a different output. Thus, errors may be corrected.

Using system 1200, reversible logic gates 1210 may be provided. Further, errors that would otherwise be present may be corrected. As a result, system 1200 may be subject to fewer errors. Performance may thus be improved.

Figure 12:
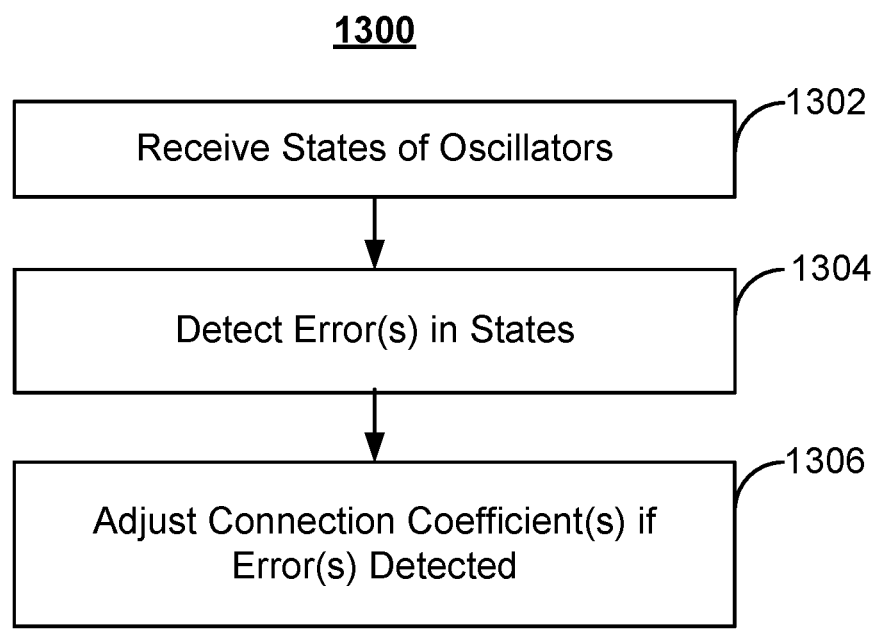
FIG. 12 depicts an embodiment of a method for utilizing digital oscillators in performing logic operations.

FIG. 12 is a flow chart depicting an embodiment of method 1300 for performing error correction for logical operations. For clarity, only some steps are indicated. Although depicted in a particular order, in some embodiments, method 1300 may include other and/or additional processes that may be performed in another order.

The states of the oscillators used in performing the logic operation are received, at 1302. In some embodiments, digital oscillators receive the inputs for the logic operation and calculate their responses. In some embodiments, an injection lock signal is provided to each of the digital oscillators as part of the inputs. As a result, the digital oscillators more readily synchronize to their final states. Any error(s) in the states are detected, at 1304. In some embodiments, the errors are detected based on the inputs to the oscillators, the states of the oscillators and the known function of the logic operation(s). Thus, the output of the logic gate(s) formed using the digital oscillators and/or logic operations may be compared to the expected output in order to detect errors.

Connection coefficient(s) between the digital oscillators are tuned in response to detecting the error(s), at 1306. Thus, the coupling between the oscillators and/or for particular oscillator(s) may be adjusted to correct the error. In some embodiments, tuning the connection coefficient(s) includes pinning the connection coefficient(s) at a value corresponding to a logical "1" or a logical "0".

For example, if system 1000 utilizes method 1300, inputs are provided to digital oscillators 1020. Digital oscillators 1020 calculate their responses. Error correction unit 1040 receives the states of digital oscillators 1020 in logic gate(s) 1010, at 1302. Error correction unit 1040 also receives the inputs to digital oscillators 1020 at 1302. At 1304, error correction unit 1040 determines whether an error is present, for example by comparing the output of the logic gate(s) to an expected output. In response to an error being detected, error correction unit 1040 tunes the connection coefficients to one or more of digital oscillators 1020.

Thus, using method 1300, system 1000 may be used performing reversible logic operations. Because error correction unit 1040 corrects errors, the desired accuracy for system 1000 may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of digital oscillators; and
   at least one programmable interconnect configured to provide weights for and to selectably couple at least a portion of the plurality of digital oscillators,
   wherein the plurality of digital oscillators and the at least one programmable interconnect form an optimization processing unit (OPU);
   wherein the plurality of digital oscillators includes a plurality of injection locked digital oscillators, each of the plurality of the injection locked digital oscillators being a differential equation solver; and
   wherein the differential equation solver is configured to solve at least one governing differential equation for a resistance-inductance-capacitance circuit.

2. The system of claim 1, wherein the differential equation solver is configured to model a real portion of a state and an imaginary portion of the state, the state corresponding to a phase of an injection locked digital oscillator of the plurality of injection locked digital oscillators.

3. A system, comprising:
   a plurality of digital oscillators; and
   at least one programmable interconnect configured to provide weights for and to selectably couple at least a portion of the plurality of digital oscillators,
   wherein the plurality of digital oscillators and the at least one programmable interconnect form an optimization processing unit (OPU);
   wherein the plurality of digital oscillators includes a plurality of injection locked digital oscillators, each of the plurality of the injection locked digital oscillators being a differential equation solver;
   wherein the differential equation solver is an Euler's method differential equation solver.

4. A system, comprising:
a plurality of digital oscillators; and
at least one programmable interconnect configured to provide weights for and to selectably couple at least a portion of the plurality of digital oscillators,
wherein the plurality of digital oscillators and the at least one programmable interconnect form an optimization processing unit (OPU);
wherein the plurality of digital oscillators includes a plurality of injection locked digital oscillators, each of the plurality of the injection locked digital oscillators being a differential equation solver;
wherein the differential equation solver is a Kuramoto model differential equation solver.

5. A system, comprising:
a plurality of digital oscillators; and
at least one programmable interconnect configured to provide weights for and to selectably couple at least a portion of the plurality of digital oscillators,
wherein the plurality of digital oscillators and the at least one programmable interconnect form an optimization processing unit (OPU);
wherein the plurality of digital oscillators includes a plurality of injection locked digital oscillators, each of the plurality of the injection locked digital oscillators is a differential equation solver;
wherein the differential equation solver is configured to solve a plurality of coupled differential equations corresponding to a satisfiability problem, the plurality of coupled differential equations including:

$$\frac{ds_i}{dt} = -(\nabla_s V(s, a)) = -\left(2J\hat{s} + h + \frac{1}{4}(\hat{s}^{\circ 3} - \hat{s})\right)$$

$$\frac{da_m}{dt} = a_m K_m(s)^2 = G\left(A\frac{1}{2}(\hat{s} + \hat{1}) - b\right)^2$$

where $a_m$ is a constraint term, $s_i$ is an Ising spin, G is a diagonal matrix including $a_m$, A is a matrix of constraints, and m and i are integers.

6. The system of claim 1, wherein at least one the programmable interconnect includes a digital matrix multiplier, the digital matrix multiplier configured to sparsely or fully connect the plurality of digital oscillators.

7. The system of claim 1, further comprising:
at least one processor coupled to the OPU.

8. A system comprising:
a plurality of digital oscillators coupled to perform a logic operation; and
an error correction unit coupled to the plurality of digital oscillators, the error correction unit configured to sample a plurality of states of the plurality of digital oscillators, detect at least one error in the plurality of states, and tune at least one connection coefficient between the plurality of digital oscillators in response to detecting the at least one error, wherein to tune the at least one connection coefficient, the error correction unit is further configured to:
pin the at least one connection coefficient at a first value corresponding to a logical "1" or a second value corresponding to a logical "0";
wherein the plurality of digital oscillators includes a plurality of injection locked digital oscillators, wherein each of the plurality of injection locked digital oscillators is a differential equation solver selected from a Kuramoto model differential equation solver and an Euler's method differential equation solver.

9. The system of claim 8, wherein an injection locked digital oscillator of the plurality of injection locked digital oscillators is configured to model a real portion of a state and an imaginary portion of the state, the state corresponding to a phase of the injection locked digital oscillator.

10. A method, comprising:
receiving, at an optimization processing unit (OPU), data for at least a portion of an optimization problem, the OPU including a plurality of digital oscillators and at least one programmable interconnect, the plurality of digital oscillators including a plurality of injection locked digital oscillators, each of the plurality of injection locked digital oscillators being a differential equation solver;
calculating, in the plurality of digital oscillators, a plurality of responses for the at least the portion of the optimization problem, the calculating the plurality of responses further includes
  determining a solution to a differential equation in the differential equation solver utilizing at least one of a Kuramoto model and Euler's method;
applying, via the at least one programmable interconnect, a plurality of weights to the plurality of responses from the plurality of digital oscillators to provide a plurality of weighted responses;
providing, via the at least one programmable interconnect, at least one of the plurality of weighted responses for each of the plurality of digital oscillators as at least one input to each digital oscillator of at least a portion of the plurality of digital oscillators; and
receiving at each of the plurality of digital oscillators an injection lock signal.

11. The method of claim 10, wherein the receiving further includes:
receiving, at the OPU, the at least the portion of the data for the optimization problem from at least one of a central processing unit coupled with the OPU and a graphics processing unit coupled with the OPU.

12. The method of claim 10, wherein an injection locked digital oscillator of the plurality of injection locked digital oscillators is configured to model a real portion of a state and an imaginary portion of the state, the state corresponding to a phase of the injection locked digital oscillator.

* * * * *